(12) United States Patent
Kumagai et al.

(10) Patent No.: US 8,068,164 B2
(45) Date of Patent: Nov. 29, 2011

(54) FACE RECOGNITION AUTO FOCUS APPARATUS FOR A MOVING IMAGE

(75) Inventors: Fumihiro Kumagai, Tokyo (JP); Takashi Kawai, Chiba (JP); Soroj Triteyaprasert, Tokyo (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 12/190,728

(22) Filed: Aug. 13, 2008

(65) Prior Publication Data

US 2009/0073304 A1    Mar. 19, 2009

(30) Foreign Application Priority Data

Sep. 14, 2007   (JP) ................................ 2007-238694

(51) Int. Cl.
*G03B 13/00* (2006.01)
*G03B 3/00* (2006.01)
(52) U.S. Cl. ........ 348/345; 348/348; 348/349; 348/353; 396/89; 396/121; 396/123; 396/124
(58) Field of Classification Search ................ 348/345, 348/349, 353; 396/89, 121, 123, 124, 147; 382/118
See application file for complete search history.

(56) References Cited

U.S. PATENT DOCUMENTS

| | | | | |
|---|---|---|---|---|
| 4,972,268 A * | 11/1990 | Frederick et al. | ............. | 348/357 |
| 5,877,809 A * | 3/1999 | Omata et al. | ................... | 348/345 |
| 6,873,713 B2 | 3/2005 | Okazaki et al. | | |
| 7,292,280 B2 * | 11/2007 | Yamazaki et al. | ............ | 348/363 |
| 7,298,412 B2 | 11/2007 | Sannoh et al. | | |
| 7,702,231 B2 * | 4/2010 | Sugimoto | ..................... | 396/123 |
| 7,733,412 B2 * | 6/2010 | Takayama | ..................... | 348/349 |
| 2003/0063211 A1 * | 4/2003 | Watanabe et al. | ............. | 348/345 |
| 2003/0071908 A1 | 4/2003 | Sannoh et al. | | |
| 2004/0207743 A1 | 10/2004 | Nozaki et al. | | |
| 2004/0212721 A1 * | 10/2004 | Watanabe | ..................... | 348/345 |
| 2005/0001924 A1 * | 1/2005 | Honda | ......................... | 348/348 |
| 2005/0270410 A1 * | 12/2005 | Takayama | ..................... | 348/345 |
| 2006/0077280 A1 * | 4/2006 | Nakahara | ..................... | 348/353 |
| 2006/0182433 A1 | 8/2006 | Kawahara et al. | | |
| 2007/0030381 A1 * | 2/2007 | Maeda | ......................... | 348/345 |
| 2007/0064145 A1 | 3/2007 | Sugimoto | | |
| 2007/0110422 A1 | 5/2007 | Minato et al. | | |

(Continued)

FOREIGN PATENT DOCUMENTS

JP          8-106519        4/1996

(Continued)

*Primary Examiner* — Sinh Tran
*Assistant Examiner* — Selam Gebriel
(74) *Attorney, Agent, or Firm* — Oblon, Spivak, McClelland, Maier & Neustadt, L.L.P.

(57) ABSTRACT

A data processing device includes: a face-detecting unit to detect a face region from an input image input from an imaging unit which images a subject including a face; a setting unit to calculate subject distance based on the face size of the face detected by the face-detecting unit, and set limits as a focus lens operation range before and after a focus lens position with the calculated subject distance as focal distance; a detecting unit to move a focus lens within the limits set by the setting unit, and detect a focal point where a detection value corresponding to the contrast intensity obtained from a face frame including the face detected by the face-detecting unit is not smaller than a threshold; and a control unit to determine, in a case wherein a focal point has been detected within predetermined set time, the focal point thereof as a focus position.

11 Claims, 19 Drawing Sheets

U.S. PATENT DOCUMENTS

| | | | |
|---|---|---|---|
| 2007/0280662 A1* | 12/2007 | Endo | 396/67 |
| 2007/0285528 A1* | 12/2007 | Mise et al. | 348/222.1 |
| 2008/0158408 A1* | 7/2008 | Asano | 348/348 |
| 2008/0240700 A1* | 10/2008 | Takagi | 396/98 |
| 2009/0009651 A1* | 1/2009 | Takayanagi | 348/345 |
| 2009/0066815 A1* | 3/2009 | Nozaki et al. | 348/231.99 |

FOREIGN PATENT DOCUMENTS

| | | |
|---|---|---|
| JP | 10-213737 | 8/1998 |
| JP | 11-175724 | 7/1999 |
| JP | 2001-167110 | 6/2001 |
| JP | 2001-215403 | 8/2001 |
| JP | 2001-256496 | 9/2001 |
| JP | 2001-331799 | 11/2001 |
| JP | 2003-107335 | 4/2003 |
| JP | 2003-242486 | 8/2003 |
| JP | 2004-317699 | 11/2004 |
| JP | 2005-86682 | 3/2005 |
| JP | 2006-18246 | 1/2006 |
| JP | 2006-33440 | 2/2006 |
| JP | 2006-227080 | 8/2006 |
| JP | 2007-108093 | 4/2007 |

* cited by examiner

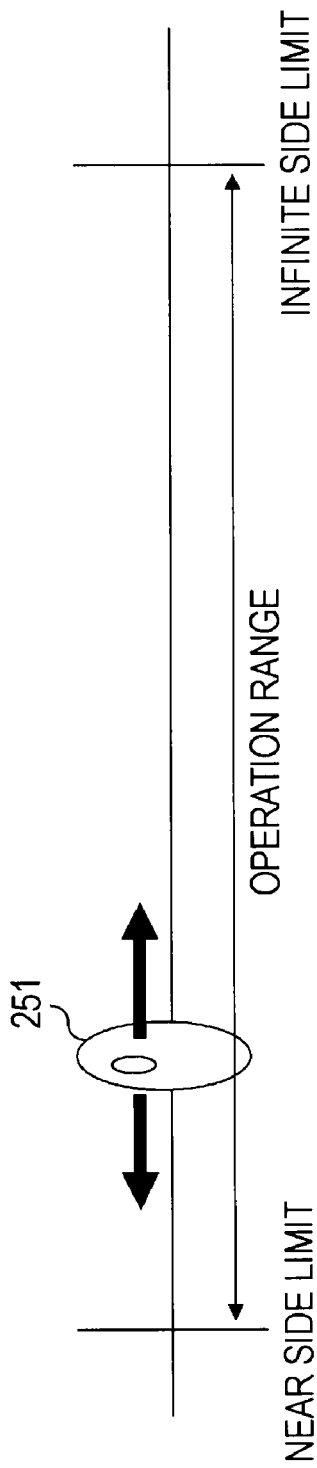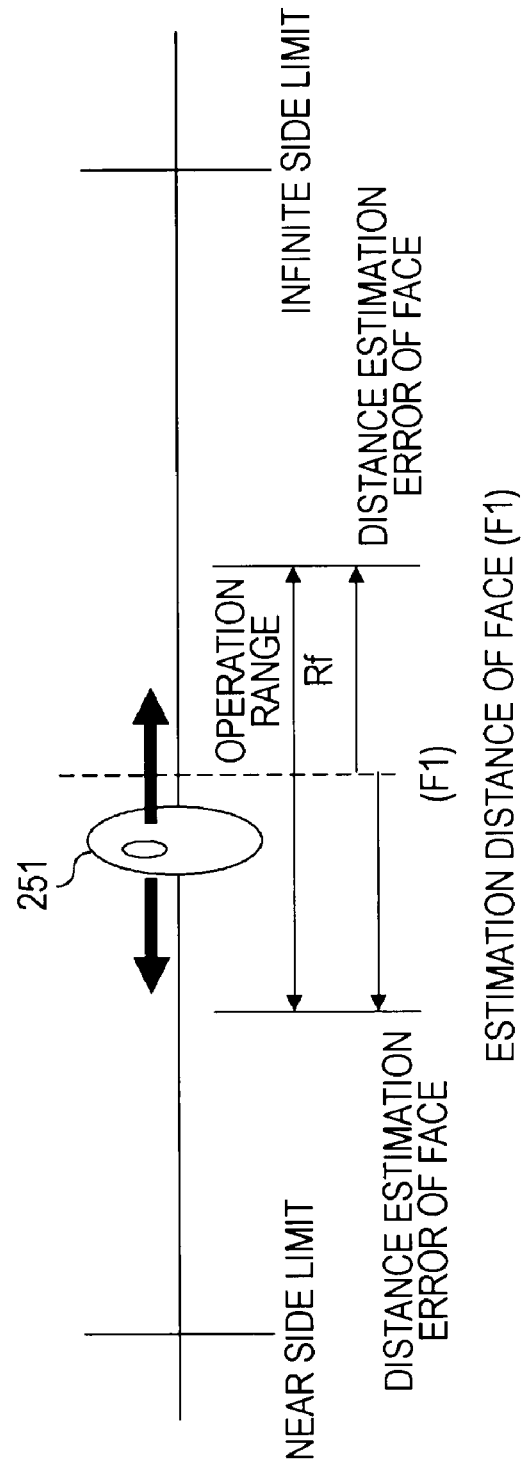

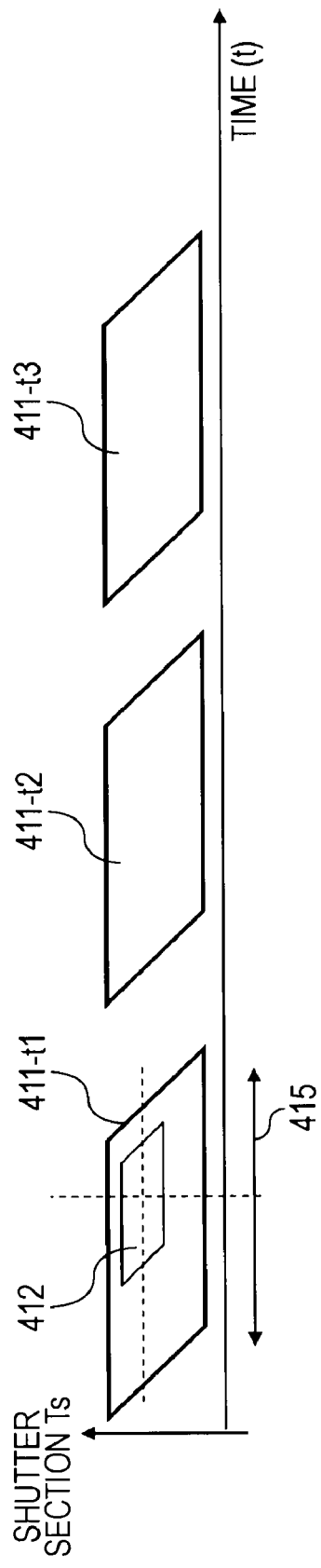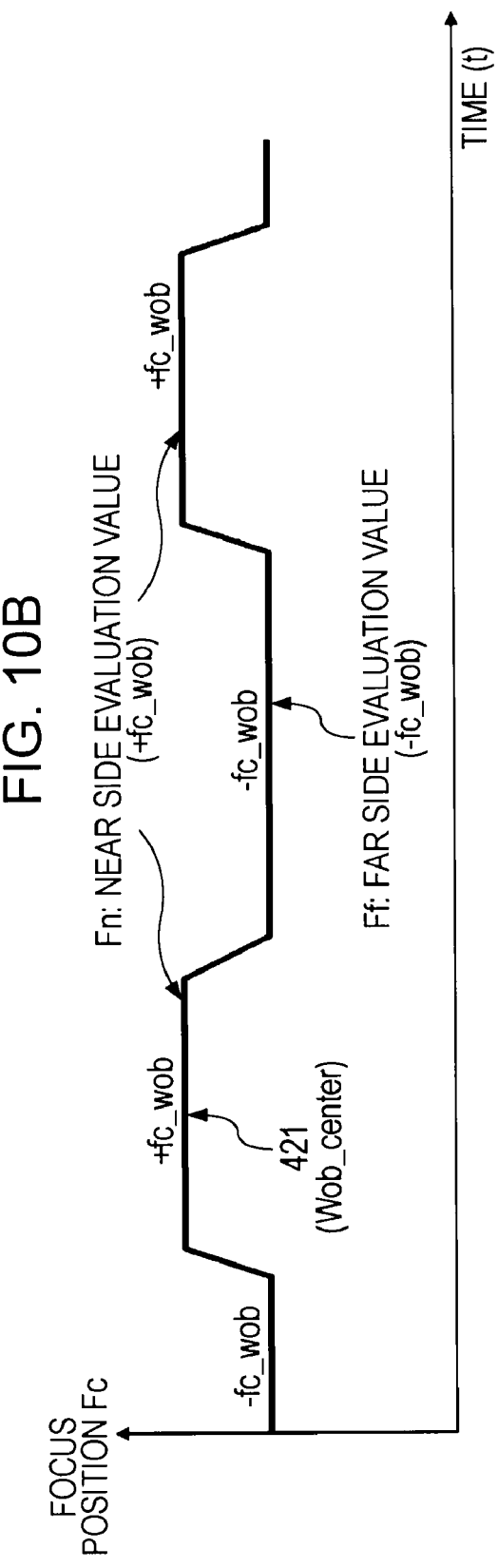

FACE RECOGNITION AUTO FOCUS APPARATUS FOR A MOVING IMAGE

CROSS REFERENCES TO RELATED APPLICATIONS

The present invention contains subject matter related to Japanese Patent Application JP 2007-238694 filed in the Japanese Patent Office on Sep. 14, 2007, the entire contents of which are incorporated herein by reference.

BACKGROUND OF THE INVENTION

1. Field of the Invention

The present invention relates to an imaging apparatus, imaging apparatus control method, and computer program, and more particularly relates to an imaging apparatus, imaging apparatus control method, and computer program whereby rapid and accurate autofocus processing as to a target subject.

2. Description of the Related Art

With a recent great number of imaging apparatuses such as still cameras, video cameras, and so forth, an autofocus (AF) mechanism for automatically focusing on a subject is implemented.

As for this autofocus control technique, a technique has been known wherein a contrast level of imaged data obtained through a lens is determined. Specifically, this technique is a technique wherein a specific region of an imaged image is set as a signal obtaining region (space frequency extraction area) for focus control, determination is made that the higher the contrast of this specific region is, the more the imaged image is in focus, and the lower the contrast is, the more the imaged image is out of focus, and a lens is driven to move a position to enhance the contrast, thereby adjusting focus. Such a focus control processing arrangement has been described, for example, in Japanese Unexamined Patent Application Publication No. 10-21373.

Specifically, there is applied a method wherein the high-frequency components of a specific region are extracted, integration data of the extracted high-frequency components is generated, and a contrast level is determined based on the generated high-frequency component integration data. That is to say, multiple sheets of images are obtained while moving a focus lens to multiple positions, and the brightness signals of each image are subjected to filter processing represented by a high-pass filter, thereby obtaining an AF evaluation value indicating the contrast intensity of each image. At this time, in a case wherein there is a subject which is in focus at a certain focus position, the AF evaluation value as to the focus position draws a curve such as shown in FIG. 1. The peak position P1 of this curve, the position where the contrast value of an image becomes the maximum is a focal position where the image is in focus. This method is for detecting the peak of contrast intensity, and is also referred to as a climbing method.

With this method, focusing operation can be performed, which is focus control using the information of an image reflected to an imager, there is no need to provide a ranging optical system in addition to an imaging optical system, and accordingly, this method has been employed widely with recent digital cameras.

Thus, with autofocus control, the high-frequency component integration value of a specific region is calculated to determine a contrast level, thereby employing this as an evaluation value (AF evaluation value). A focus lens is driven such that the evaluation value becomes the maximum, thereby realizing autofocus. In order to perform autofocus, there is a need to drive a lens with the above-mentioned evaluation value as an indicator. As for a lens driving mechanism, for example, a voice coil motor or the like is employed.

Note however, an autofocus (hereafter, abbreviated to "AF") device employing a contrast extraction method for selecting a focus position with such contrast as an index value is apt to focus on a background including a great number of high-frequency components. For example, as shown in FIG. 2, a desired subject positioned at a central frame 20 or the like, which is the central portion of an screen overall frame 10 equivalent to the overall region of a shot image shot at an imaging apparatus, is out of focus, and consequently, a phenomenon called background focus occurs in some cases wherein a background is erroneously focused on.

Particularly, this background focus occurs markedly in a case wherein a subject is a face or the like. This is because a face is low in contrast as compared to a background portion, and consequently, a background portion having high contrast is taken as the best focus position of the screen overall frame 10.

If a correct subject can be recognized, it becomes possible to focus on a correct subject. That is to say, in a case wherein, with the settings such as shown in FIG. 2, a correct subject is taken as a person's face, correct focus control as to the target subject can be performed by recognizing this face, setting a ranging area (detection frame) where contrast is detected to perform focus control of a face frame 30, and performing focus control by contrast extraction restricted to the ranging area (detection frame).

With usual camera shooting, there are a great number of cases wherein a person is the principal subject, but a person takes various positions within an image to be shot, and accordingly, there are various types of pictorial composition. In order to handle such a problem, an arrangement has been proposed wherein a face is recognized from an image at an imaging apparatus, and a ranging area is set to the position of the recognized face, whereby focusing on the face can be performed regardless of the composition. For example, a focus control arrangement based on such face recognition has been disclosed in Japanese Unexamined Patent Application Publication No. 2003-107335. This focus control based on face recognition enables suitable focus control (focusing) with shooting of various types of composition.

Some digital still cameras having such a face recognition function already employed, wherein this function is employed in the case of shooting an image including a face. Note however, there has been no case of commercialization of such a video camera. Video cameras are for shooting moving images, the movement of a face region itself occurs, so applying face recognition to autofocus at the time of taking a moving image frequently collapses, so the current state is that practical realization is difficult.

With regard to an arrangement applying a person extraction technique from image data to a camera, for example, there is Japanese Unexamined Patent Application Publication No. 2004-317699 wherein an arrangement for determining a focus position based on a face size at high speed has been disclosed. Also, a distance estimation technique for executing distance measurement up to a subject based on the principle of triangulation has been described in Japanese Unexamined Patent Application Publication No. 2001-215403.

Also, an arrangement for performing processing for switching a contrast extraction area, for example, between the central frame 20 and face frame 30 shown in FIG. 2 has been disclosed in the above-mentioned Japanese Unexamined Patent Application Publication No. 2004-317699, Japanese Unexamined Patent Application Publication No. 2006-33440, and so forth.

Also, Japanese Unexamined Patent Application Publication No. 2006-227080 has disclosed a technique wherein a ranging area (detection frame) is set by adding a body portion to a face in light of a case wherein a face is low in contrast. Also, a technique relating to specification of the priority order of face frames in a case wherein multiple faces are included has been disclosed in Japanese Unexamined Patent Application Publication No. 2005-86682.

Note however, such related art is an application corresponding to digital still cameras, and as described above, in the case of applying a face frame to a moving image taken by a video camera as such a ranging area (detection frame), there is a need to detect the face frame for each frame of the video camera. Also, when increasing frame size, a background focus problem occurs, and when reducing frame size, a problem readily occurs in that focusing is not performed correctly due to framing out or low contrast of a frame, and consequently, a focus position fluctuates. Such various problems prevent practical realization.

Note that, in a case wherein a face region is employed as a ranging area (detection frame), there is a problem in that a detection signal from the detection frame set to the face region becomes unstable, but for example, Japanese Unexamined Patent Application Publication No. 2006-162215 has disclosed, as one of solution techniques for this problem, an arrangement wherein in the case of no detection from the detection frame being performed, the detection frame is held at a face detection area.

Note that, in addition to focus position settings based on the above-mentioned contrast determination, a technique has also been disclosed wherein the distance up to a face is measured based on a face size of an image obtained from a camera to estimate a focus position. Note however, face sizes differ between adults and children. Accordingly, with distance estimation based of a face size, it is desirable to perform estimation based on a face type classification such as an adult's face, child's face, and so forth. A technique has been disclosed in, for example, Japanese Unexamined Patent Application Publication Nos. 2003-242486, 11-175724, 8-106519, 2001-256496, 2001-167110, and 2001-331799, and so forth, wherein determination of face attributes (adult, child, etc.) is made by clustering of the feature amount of faces, or the like, and this determination results are employed to estimate the distance up to a face from a face size of an image obtained from a camera.

SUMMARY OF THE INVENTION

As described above, an arrangement is frequently employed with digital cameras, wherein a face is recognized from an image at an imaging apparatus, and a ranging area is set to the position of the recognized face to make it possible to focus on the face, but with video cameras, the movement of a face region itself occurs, so applying face recognition to autofocus at the time of taking a moving image frequently collapses, so the current state is that this arrangement has not been put into practical use.

It has been recognized that there is a need to provide an imaging apparatus, imaging apparatus control method, and computer program whereby stable focus control can be performed using face recognition technology with a video camera.

Also, it has been recognized that there is a need to provide an imaging apparatus, imaging apparatus control method, and computer program whereby occurrence of background focus is suppressed, a principal subject is correctly traced, and stable focus control is performed.

A data processing device according to an embodiment of the present invention includes: a face-detecting unit configured to detect a face region from an input image input from an imaging unit configured to image a subject including a face; a setting unit configured to calculate subject distance based on the face size of the face detected by the face-detecting unit, and set limits serving as a focus lens operation range before and after a focus lens position with the calculated subject distance as focal distance; a detecting unit configured to move a focus lens within the limits set by the setting unit, and detect a focal point where a detection value corresponding to the contrast intensity obtained from a face frame including the face detected by the face-detecting unit is equal to or greater than a predetermined threshold; and a control unit configured to determine, in a case wherein a focal point has been detected within predetermined set time, the focal point thereof as a focus position.

The control unit may, in a case wherein a focal point has not been detected within predetermined set time, cancel the limits set by the setting unit.

The control unit may set the following limits of
a near side limit [Fc_near_new], and
a far side operation limit [Fc_far_new],
as limits serving as the focus lens operation range, based on the upper limit and lower limit data of a predetermined stipulated face size.

The control unit may control execution timing for executing wobbling processing at the time of moving a focus lens within the limits set by the setting unit to determine a focus position in accordance with detection timing according to the face frame including the face detected by the face-detecting unit.

The data processing device may further include: a calculation unit configured to calculate a score employing at least any of the following (a) through (c) of the face detected by the face-detecting unit
  (a) Size of a face,
  (b) Distance from the center of a face image, and
  (c) Whether or not a face has been detected as a principal subject last time; wherein the control unit selects the face having a high score calculated by the calculation unit as a principal face serving as a focal object.

The control unit may track the principal face which has been set by the control unit, and in the case of the tracking having failed, select the next principal face.

The control unit may, with a focus control execution period within the set limits, based on the calculated subject distance employing the face detected by the face-detecting unit, alleviate the limits, in the case of detecting movement of a screen or face frame which is equal to or greater than a predetermined threshold, or input of operating information of any of zooming, panning, and tilting.

The control unit may determine the attributes of a person based on the features of the face detected by the face-detecting unit, perform estimation of a face size based on the attributes, and calculate subject distance employing the estimated face size.

The data processing device may further include an imaging unit configured to image a subject including a face.

A data processing method according to an embodiment of the present invention includes the steps of: detecting a face region from an input image input from an imaging unit for imaging a subject including a face; calculating subject distance based on the face size of the face detected in the detecting, and setting limits serving as a focus lens operation range before and after a focus lens position with the calculated subject distance as focal distance; moving a focus lens within the limits set in the setting, and detecting a focal point where a detection value corresponding to the contrast intensity obtained from a face frame including the face detected in the detecting is equal to or greater than a predetermined threshold; and determining, in a case wherein a focal point has been detected within predetermined set time, the focal point thereof as a focus position.

Note that the computer program according to an embodiment of the present invention is a computer program which can be provided to general-purpose computer systems capable of executing various types of program code for example, by way of recording media or communication media in a computer-readable form. Providing such a program in a computer-readable format realizes processing corresponding to the program on the computer system.

Further objects, features, and advantages of the present invention will become apparent from more detailed description based on the later-described embodiments of the present invention and the attached drawings. Note that system as used in the present specification is a logical group configuration of multiple devices, and is not restricted to each component device being within the same housing.

With the arrangement of an embodiment of the present invention, with autofocus processing of an imaging apparatus, a face region is detected from an input image, subject distance is calculated based on the size of the detected face, and a focus position is estimated based on the calculated subject distance information. Further, a focus lens operation range which is shorter than the overall operation range of a focus lens is set based on the estimated focus position, and the focus lens is moved within the set lens operation range to determine a focus lens set position. According to the present arrangement, the distance of the lens to be moved under focus control can be set shorter, thereby realizing high-speed focus control.

BRIEF DESCRIPTION OF THE DRAWINGS

FIG. 5A is a diagram illustrating a focus lens operation range according to focus control of the related art, and FIG. 5B is a diagram illustrating a focus lens operation range according to focus control to which estimated distance information based on face detection in accordance with an embodiment of the present invention has been applied;

FIG. 10 is a diagram for describing wobbling processing;

DESCRIPTION OF THE PREFERRED EMBODIMENTS

Hereafter, description will be made regarding the details of an imaging apparatus, imaging apparatus control method, and computer program according to an embodiment of the present invention with reference to the drawings. With an embodiment of the present invention, a person's face is detected from shot image frames to perform focus control as to the detected face at the time of shooting with an imaging apparatus capable rapid correct autofocus as to a target subject, and particularly with an imaging apparatus serving as a video camera for taking a moving image.

Figure 3:
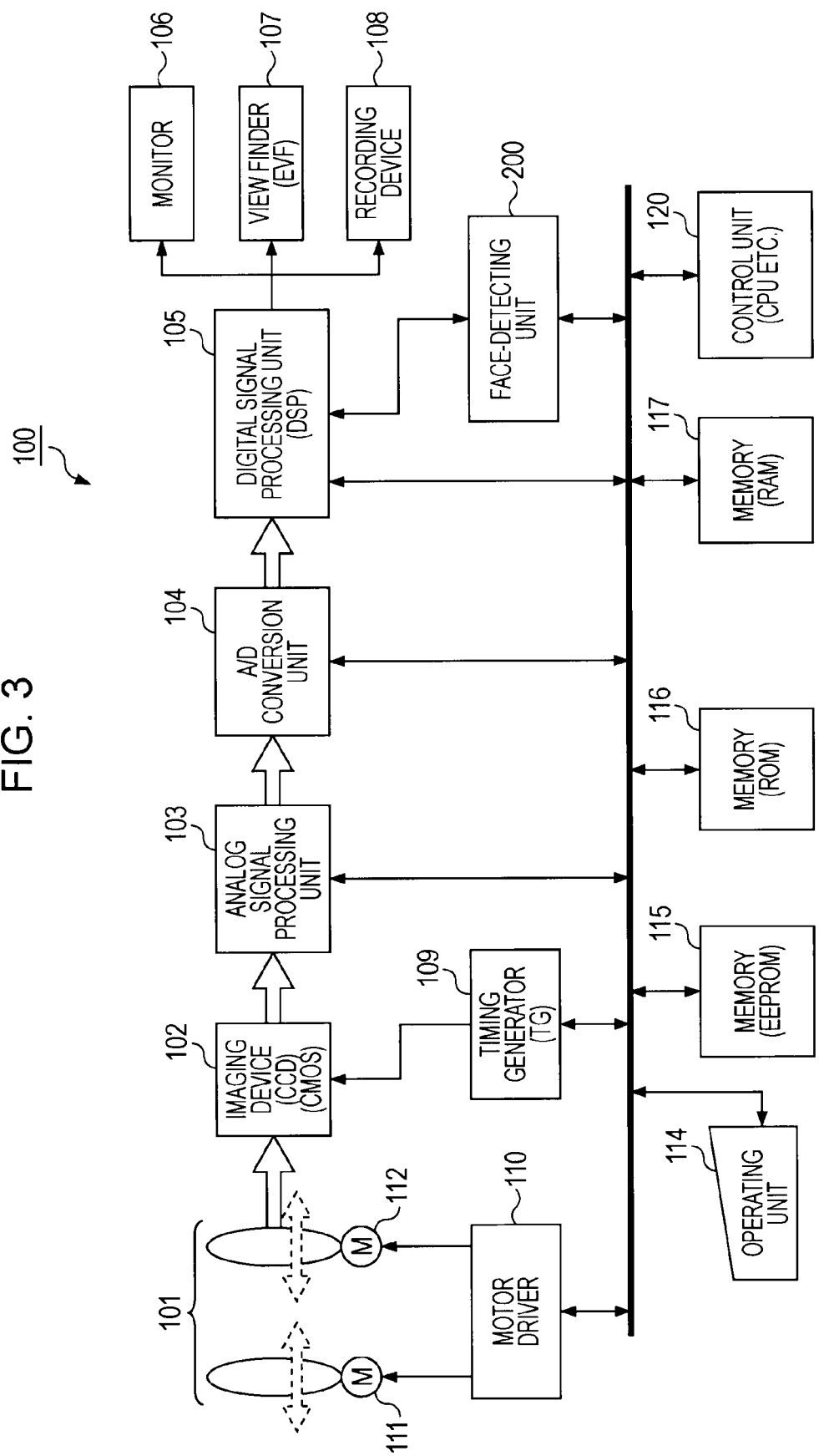
FIG. 3 is a diagram for describing a hardware configuration example of the imaging apparatus.

FIG. 3 is a block diagram showing an example of the functional configuration of an imaging apparatus 100 as a data processing apparatus according to an embodiment of the present invention. An imaging lens 101 internally includes a zoom lens for consecutively changing focal distance, a focus lens for adjusting focus, aperture diaphragm for changing the aperture, an ND mechanism for inserting an adjustment ND (Neutral Density) filter employed for adjusting brightness while reducing diffraction effects according to the aperture, a shift vibration-proof shaking correction lens for correcting shaking at the time of shooting, and so forth.

With the imaging lens 101, a subject image is formed on an imaging device 102. As for the imaging device, a CCD or CMOS type imaging device widely employed as a solid imaging device is employed.

An imaging apparatus 100 includes the imaging lens 101 for condensing a picture on the imaging device 102, a timing generator (TG) 109 for setting the image capturing timing of the imaging device, actuator 111 for driving a zoom lens on the lens, actuator 112 for driving a focus lens on the lens, motor driver 110 for driving those, and control unit 120 for controlling the lens position of the focus or zoom lens.

In the case of a small video camera, as a focus lens a lens called an inner focus type is frequently employed, which interfaces with movement of a zoom lens under microcomputer control in accordance with a curve called tracking curve, and the focus and zoom lenses are interfaced by a microcomputer, and are controlled by a lens motor through a predriver and driver IC.

The captured signal of the imaging device 102 is subjected to signal processing by an analog signal processing unit 103, A/D conversion unit 104, and digital signal processing unit 105. The processing of each processing unit is controlled by the control unit 120.

The photoelectric conversion data output from the imaging device 102 is input to the analog signal processing unit 103, is subjected to processing such as noise removal or the like at the analog signal processing unit 103, and is converted into a digital signal at the A/D conversion unit 104. The digital data converted at the A/D conversion unit 104 is input to the digital signal processing unit 105, and is subjected to various types of image processing such as outline enhancement, gamma correction, flicker removal, and so forth at the digital signal processing unit 105. The digital signal processing unit 105 through control unit 120 include at least an automatic focusing mechanism, automatic exposure mechanism, automatic white balance adjustment mechanism, and so forth, and control signals and the motor included in a lens unit to realize the best focus position, best brightness, and best color reproduction.

The picture signal processed at the digital signal processing unit 105 is output or stored as to a monitor 106 configured of a liquid crystal panel and so forth, view finder 107, or recording device 108.

The imaging apparatus 100 further includes an operating unit 114 for detecting a user's input, nonvolatile memory 115 such as EEPROM or flash memory which is memory for storing settings, memory (ROM) 116 storing a program and so forth executed by the control unit 120, RAM 117 employed for a work area of the program executed by the control unit 120, and face-detecting unit 200.

The face-detecting unit 200 receives a shot image from the digital signal processing unit 105, and performs processing for detecting a face region within the shot frames. With regard to the face recognition and tracking technology of the face-detecting unit 200, various types of technology have already been disclosed, and this technology can be applied to the face-detecting unit 200. For example, such as shown in Japanese unexamined Patent Application Publication No. 2004-133637, this technology can be realized by matching a template in which the brightness distribution information of a face is recorded with an actual image. Specifically, first, multiple types of images obtained by subjecting an actual image to reduction processing are prepared. Further, a face brightness distribution information template group obtained when tilting the face is prepared, and the reduced actual images and templates are subjected to matching sequentially. The templates tilt as to each of the X, Y, and Z axes of a face three-dimensional orthogonal coordinates system, and the actual tilt of the face is determined by matching with the templates.

When sequentially matching between the reduced image and the templates while shifting the image on the two-dimensional plane, if a certain region of the image matches with the template, the region thereof is a position where the face exists, and the size of the face can be obtained from the reduction ratio of the actual image. Also, the rotation angle, pitch, roll angle around the orthogonal three axes can be obtained from the template employed at that time. Autofocus control is performed by executing estimation of the distance to the face using the thus obtained face size, position, and rotation angle. Employing the estimation information of the distance to the face enables the operation range (Rf) of the focus lens to be set small.

Figure 4:
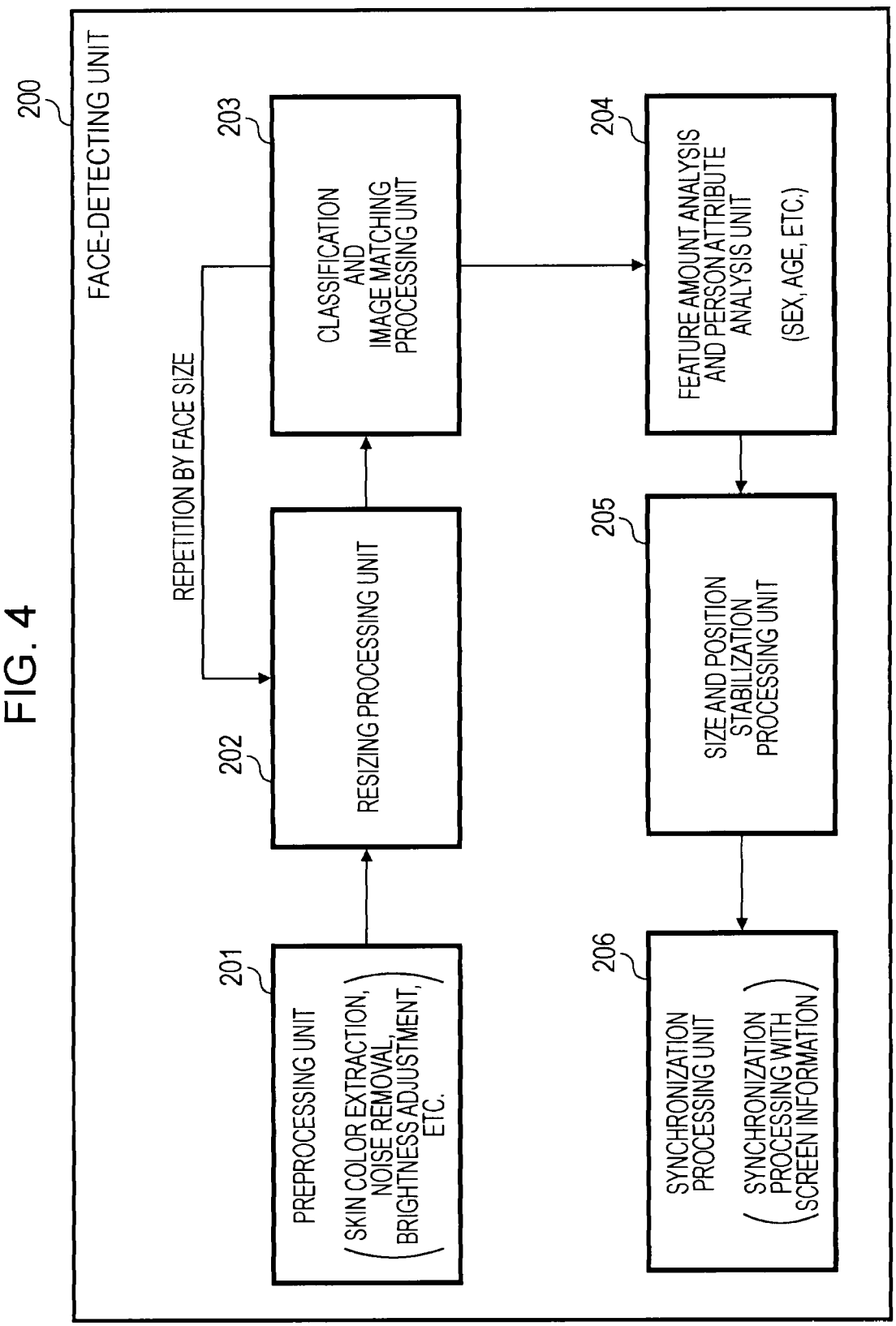
FIG. 4 is a diagram for describing the configuration of a face-detecting unit.

The configuration of the face-detecting unit 200 will be described with reference to FIG. 4. The face-detecting unit 200 includes, as shown in FIG. 4, a preprocessing unit 201, resizing processing unit 202, classification and image matching processing unit 203, feature amount analysis and person attribute analysis unit 204, size and position stabilization processing unit 205, and synchronization processing unit 206.

The preprocessing unit 201 extracts a skin area or removes unnecessary frequency components from the shot image frames input from the digital signal processing unit 105. The resizing processing unit 202 is a processing unit for performing adjustment of various face sizes within the image frames, and converts these sizes into a defined size suitable for the matching processing executed by the face-detecting unit 200.

The classification and image matching processing unit 203 performs classification to execute different detection processing for each face direction or attribute, and executes matching processing with face feature information registered beforehand. The feature amount analysis and person attribute analysis unit 204 extracts the positions of face feature points, and determines the attributes of a person based on the extracted feature amount. Note that the attributes include photograph if still, sex determination wherein determination is made that the person is a female in a case wherein the feature point layout is a layout closer to a female pattern, age estimation wherein an age is estimated from the positions of the eyes and mouth of a face, and so forth. The control unit 120 performs estimation of a face size based on the attributes determined by the person attribute analysis unit 204, and executes subject distance calculation to which the estimated face size has been applied.

The size and position stabilization processing unit 205 executes stabilization processing for preventing the positions of the faces detected from the image frames from fluctuating or disappearing. The synchronization processing unit 206 performs processing for synchronizing between screen information detecting timing and face information detecting timing.

Note that the face-detecting unit 200 records feature points such as the shape, position, size of the face obtained from the shot image frames in the memory set within the face-detecting unit 200 or one of the memory 115 through 117 shown in FIG. 3, and the feature amount analysis and person attribute analysis unit 204 determines person attributes based on the recorded feature point information.

The control unit 120 inputs detection information including a face size as face detection information from the face-detecting unit 200, executes estimation of distance from the imaging apparatus 100 to the detected face, sets a specific face as a target subject serving as a focal object, tracks the set target subject, and performs focus control for focusing on the target subject thereof.

The imaging apparatus according to an embodiment of the present invention determines the person's face serving as the target subject from image data to be shot, and executes distance estimation according to the face thereof. As described above, the face-detecting unit 200 determines the person's face from the image data obtained by the imaging apparatus. The control unit 120 executes estimation of the distance to the face using the face size and so forth obtained by the face detection processing to perform autofocus control. Employing the estimation information of the distance to the face enables the operation range (Rf) of the focus lens to be set small.

FIG. 5A illustrates a focus lens operation range according to focus control of the related art, and FIG. 5B illustrates a focus lens operation range according to focus control to which estimated distance information based on face detection in accordance with an embodiment of the present invention has been applied. In the case of performing usual autofocus control, as shown in FIG. 5A, the operation range of a focus lens 251 is set the overall range from the near side limit to the infinite side limit, the focus lens 251 is moved within this range, and the contrast level of a specific region of imaging data obtained through the lens is determined. That is to say, the high-frequency component integration value of the specific region is calculated to determine the contrast level, this is taken as an evaluation value (AF evaluation value), and a position where the AF evaluation value becomes the maximum is taken as a focus position. Performing such processing leads to a problem in that the operation range of the focus lens 251 is great, and the execution duration of focus control is prolonged.

On the other hand, with the focus control to which the estimated distance information based on the face detection in accordance with an embodiment of the present invention shown in FIG. 5B has been applied, the face size of the person serving as the target subject is determined, the subject distance is estimated based on that size, this estimation information is applied to narrow down the focus control range, thereby executing rapid focus control. That is to say, as shown in FIG. 5B, the subject distance is estimated based on the face size of the person serving as the target subject, a predetermined region including error ranges is set as the operation range (Rf) of the focus lens 251 centered on that distance (DF), the focus lens 251 is moved only within the operation range (Rf), and the contrast level is determined to determine a focus position. With this processing, the operation range of the focus lens 251 is narrowed down, whereby duration necessary for determining a focus position can be shortened.

A specific method for calculating distance to a face, and a specific method for setting a focus lens operation range (Rf) will be described. With a distance calculation method based on a face size, an arrangement is made wherein a focus lens operation range (Rf) is set such that the obtained distance ((Df) shown in FIG. 5) includes distance error information.

Figure 6:
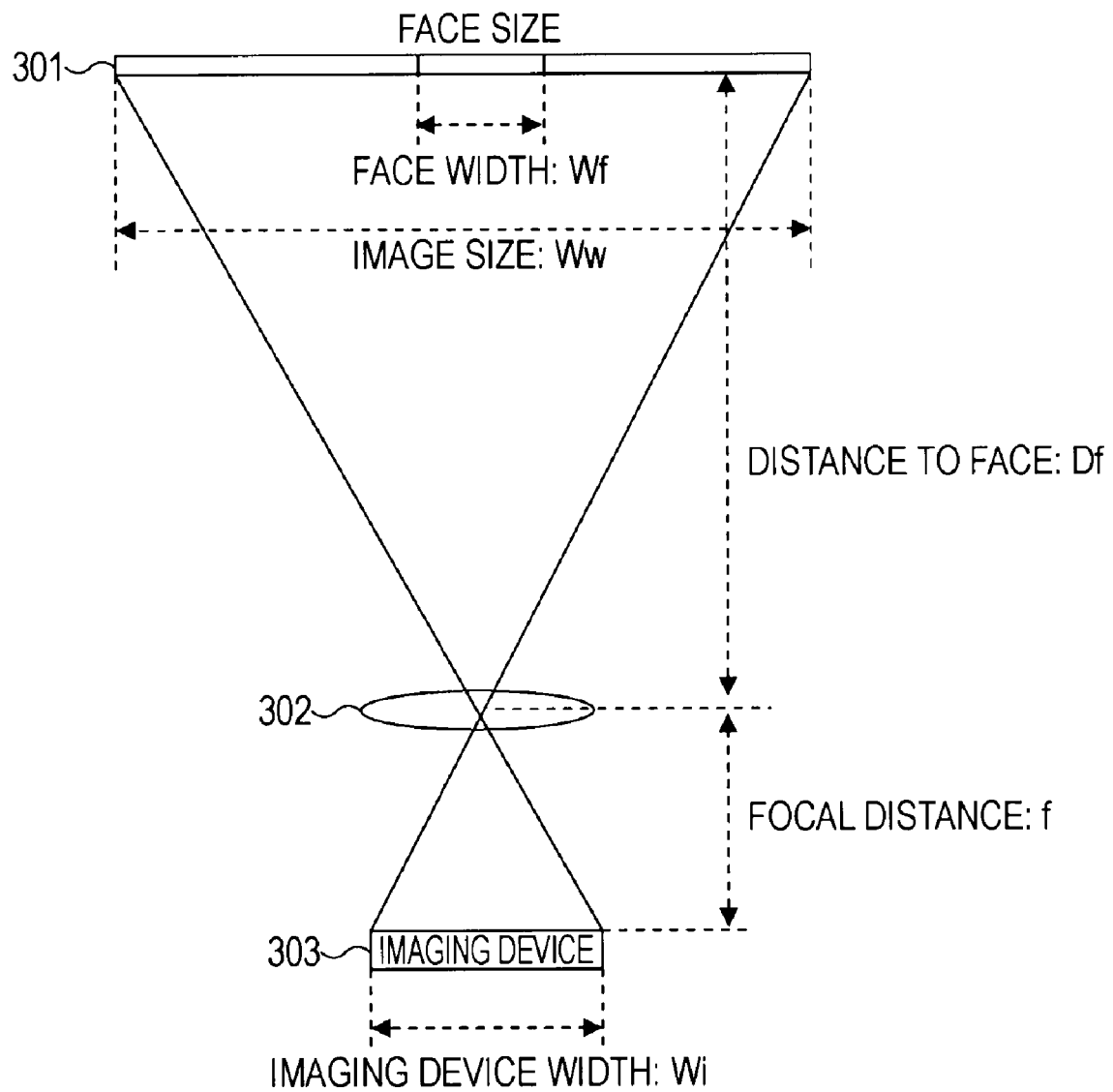
FIG. 6 is a diagram for describing processing for obtaining distance up to a face depending on the size of the face included in an image shot by the imaging apparatus.

With the imaging apparatus according to an embodiment of the present invention, the distance to a face is obtained with the size of a face included in the image shot by the imaging apparatus. This processing will be described with reference to FIG. 6. In FIG. 6, a subject position 301, focus lens 302, and imaging device 303 are illustrated. There is a person's face at the subject position 301. The face size (face width) is Wf.

If the actual face size (Wf) is known, the distance to the face, i.e., subject distance (Df), i.e., subject distance (Df) from the focus lens 302 to subject position 301 can be obtained with the following Expression (1.1) from the fundamental physical law regarding lenses.

$$Df = Wref \times (f/Wi) \times (Ws/Wf) \quad (1.1)$$

Description of each symbol within the above-mentioned Expression will be made below.
Wref: human face size reference value
Wi: imaging device width
f: focal distance Wf: number of pixels having human face size within imaged image (imaging device detection value)
Ww: number of pixels having image size employed for human face detection (imaging device detection value)

A predetermined fixed value can be employed as the human face size reference value (Wref). Note that it is possible to perform processing for setting this face size reference value (Wref) to a value in consideration of individual difference, race difference, age difference, sex difference, and so forth, and according to this processing, further precise distance estimation can be realized.

The imaging apparatus calculates subject distance (Df) by applying the above-mentioned Expression (1.1) based on the shot image (through image), includes a predetermined error range centered on the calculated subject distance (Df) to set a focus lens operation range (Rf).

If we assume a model wherein the error obtained from a face size is zero, causes for out of focus when moving the focus lens to this position are restricted to the individual difference of various types of device, and errors at the time of manufacturing. In other words, if these errors can be removed by adjustment, an image of good focus can be obtained only with a face size without employing climbing AF or specific range search AF.

Note however, in reality, it is difficult to remove those errors completely. Specifically, nonlinear focal movement in the focal distance direction, movement of a focal position due to the temperature properties of a device, and hysteresis existing between various types of devices effect on this problem. If we say that these sizes are held in a data table for each zoom position and for each focal position, and an error range is set to an at near side, and set to σf at infinite side such that the data between the tables is subjected to linear interpolation, when the distance to the face is Df, a focus lens operation range (Rf) is set as follows.

$$Rf = Df - \sigma n \sim Df + \sigma f \quad (1.2)$$

Figure 7:
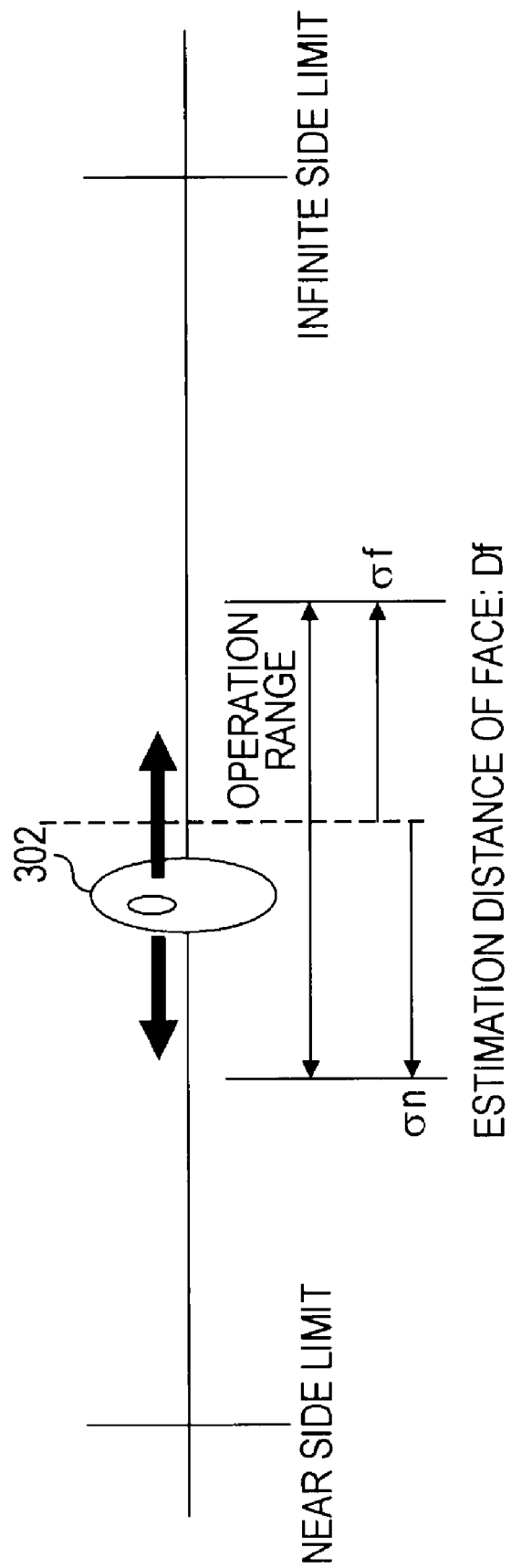
FIG. 7 is a diagram for describing a setting example of subject distance information and focus lens operation range calculated based on the size of a face.

Specifically, the operation range (Rf) of a focus lens 302 is set such as shown in FIG. 7.

Therefore, for example, a range where the maximum value of a contrast signal needs to be searched can be set as the operation range (Rf) using a climbing method which is one method of focus control based on contrast determination, the maximum value of a range to be searched when a shutter is pressed can also be set as the above-mentioned range, and accordingly, a short distance lens movement range is set as compared to the related art to enable focus control at short times.

Figure 8:
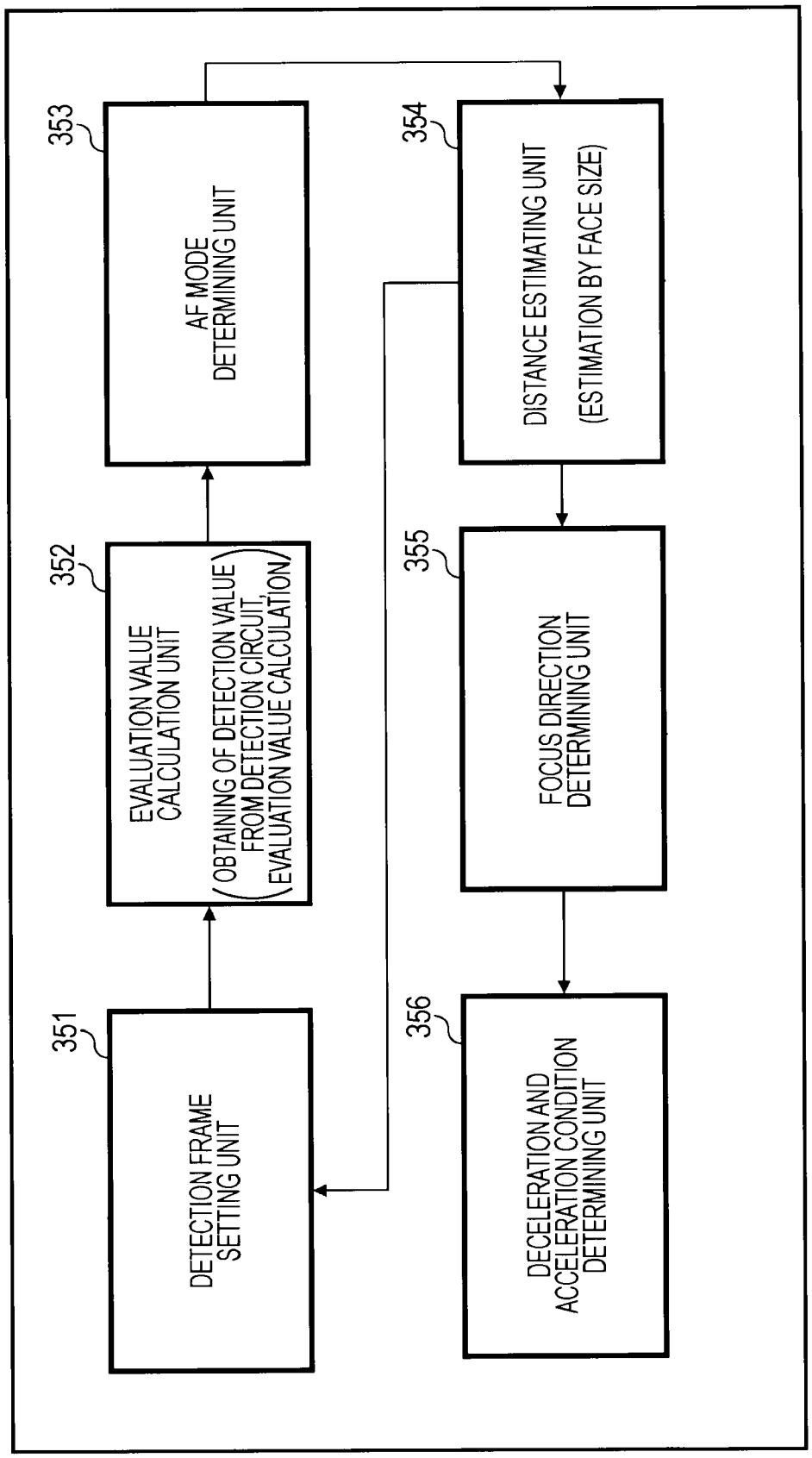
FIG. 8 is a diagram for describing a focus control configuration.

The focus control arrangement executed by the control unit 120 will be described with reference to FIG. 8. The control unit 120 performs processing for fitting focus to the specific face detected from moving image frames. This processing is executed in accordance with the program recorded in the memory (ROM) 116. FIG. 8 is a block diagram illustrating processing executed at this focus control processing as divided blocks.

The focus control processing is executed as processing employing a detection frame setting unit 351, evaluation value calculation unit 352, autofocus (AF) mode determining unit 353, distance estimating unit 354, focus direction determining unit 355, and deceleration and acceleration condition determining unit 356, such as shown in FIG. 8. Note that the components shown in FIG. 8 are illustrated individually to describe the processing performed at the control unit 120, and these components do not need to exist in the form of hardware to execute the processing. A configuration whereby the processing can be executed according to a program is sufficient.

The detection frame setting unit 351 sets a detection frame serving as a ranging area to a face region detected from image frames, and selected as a focal object. The evaluation value calculation unit 352 calculates an AF evaluation value obtained within the detection frame set by the detection frame setting unit 351, i.e., an AF evaluation value corresponding to image contrast intensity previously described with reference to FIG. 1 and so forth.

The autofocus (AF) mode determining unit 353 determines an autofocus mode executed by the imaging apparatus based on the evaluation value calculated by the evaluation value calculation unit 352. This processing will be described later.

The distance estimating unit 354 performs distance estimation processing to which a face size included in a face region selected as a focal object has been applied. This processing is equivalent to processing described with reference to FIG. 6. The focus direction determining unit 355 employs the estimated distance information calculated by the distance estimating unit 354 to determine the focus direction. The deceleration and acceleration condition determining unit 356 similarly employs the estimated distance information calculated by the distance estimating unit 354 to adjust control speed at the time of AF, e.g., the movement speed of the focus lens, and so forth.

Figure 9:
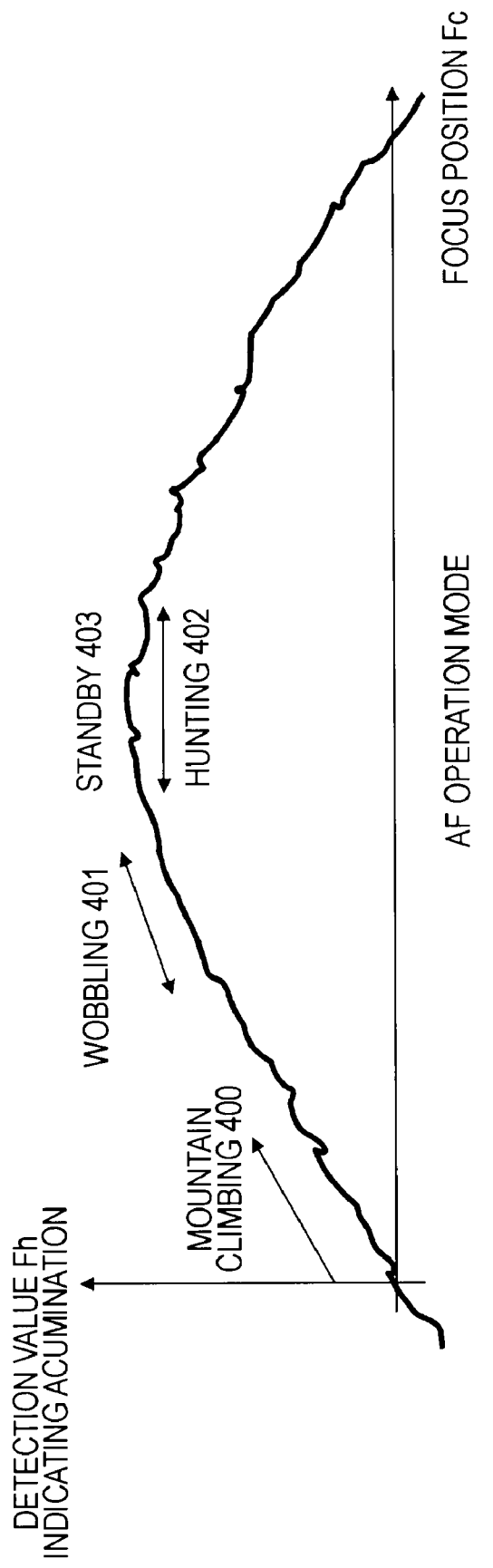
FIG. 9 is a diagram for describing processing of an evaluation value calculation unit for performing the calculation of an AF evaluation value.

Description will be made with reference to FIG. 9 regarding the processing of the evaluation value calculation unit 352 for performing calculation of the AF evaluation value to be obtained within the detection frame set by the detection frame setting unit 351. As described above, a climbing method described with reference to FIG. 9 is available as the basic processing of autofocus control. With regard to autofocus (AF) control of consumer videos cameras, there is generally employed a method called a passive type contrast extraction AF for fitting focus based on the contrast information of the picture obtained from the imaging device. With the contrast extraction AF, a focus position is controlled by calculating the operation direction of a lens so as to obtain the direction to maximize contrast based on the output of a digital filter (band-pass filter) for extracting the high frequency of an imaged picture.

In other words, multiple sheets of images are obtained while moving the focus lens to multiple positions, the brightness signal of each image is subjected to filter processing represented by a high-pass filter, thereby obtaining an AF evaluation value indicating the contrast intensity of each image. With the filter, multiple high-frequency components of a predetermined band which is identical to acumination of images are extracted based on imaging signals within a focal point detection area provided in an imaging region. Specifically, the filter includes a first high-frequency component Fa which can be extracted at AF speed from a blurred state, or even in a blurred state, and a second high-frequency component Fh from which a value is obtained only in a state closer to a focus state.

Control for maximizing the size of each of the values (Fa and Fh) itself, and the ratio thereof (Fh/Fa) is performed, but a simple and easy method for reducing error operation due to noise is that a coring value which is noise amount calculated in proportion is subtracted from all of the integration values obtained by adding (integrating) high-frequency components of the entire screen, and the result thereof is maximized, thereby maximizing contrast while avoiding noise and subjects other than the principal subject to enable focusing in a sure manner.

With regard to calculation of an F detection value serving as an AF evaluation value with a video camera according to the related art, it is common to use the data of almost all regions of the screen as all of the integration values to perform calculation in accordance with the following expression.

$$F \text{ detection value} = Fh \text{ (or } Fa\text{)} - \alpha \times \text{all of the integration values}$$

However, with the imaging apparatus according to an embodiment of the present invention, a face serving as a focal object to be focused is determined, the integration values of high-frequency components of a face region including the determined face are distinguished, [F detection value_face] serving as an AF evaluation value corresponding to the face serving as a focus target is calculated in accordance with the following expression.

$$F \text{ detection value\_face} = Fh \text{ (or } Fa\text{)} - \alpha 1 \times \text{all of the integration values (average of entire screen)} - \alpha 2 \times \text{all of the integration values (only the region including the face)}$$

$\alpha 1$ and $\alpha 2$ included in the above-mentioned expression are coring values serving as noise components, and are switched smoothly when detecting the face.

Focus control processing will be described with reference to FIG. 9. In FIG. 9, in the same way as previously described with reference to FIG. 1, the horizontal axis is equivalent to focus lens positions, and the vertical axis is equivalent to the detection value (AF evaluation value) corresponding to contrast intensity. With the focus control processing, as shown in FIG. 9, switching control of each of the following modes is performed.

(a) Climbing mode 400 wherein the focus lens is controlled from a greatly blurred state until the peak which is the maximum point of a high-frequency detection value is detected, and (b) Hunting mode 402 wherein reciprocation is repeated with high precision toward the slopes of a detection value by hunting the detection value around at the detection value focal point which is the index of contrast amount.

Further, the following mode is applied:

(c) Wobbling mode 401 wherein AF advances to the focal point detection direction by swinging the lens backward and forward at the time of hunting and when reaching near the focus peak.

In a case wherein the peak is kept within a certain range during execution of the wobbling mode 401, the focus lens enters an idle state, and AF enters a standby state until the detection value varies. When restoring from a standby state, there is a need to restart the imaging apparatus, thereby entering evaluation mode.

The AF mode determining unit 353 shown in FIG. 8 determines the autofocus mode executed by the imaging apparatus based on the evaluation value thus calculated by the evaluation value calculation unit 352, and performs mode switching as appropriate.

Note that determination conditions for determining that a focal point has been detected are satisfied wherein of the above-mentioned (1) first high-frequency component Fa which can be extracted at AF speed from a blurred state, or even in a blurred state, and (2) second high-frequency component Fh from which a value is obtained only in a state closer to a focus state, Fh/Fa which is the ratio between those high-frequency components is sufficiently great, and the detection value has a sufficiently great contrast value as to the noise amount which differs depending on illuminance (Fh is sufficiently great).

Note that a focus position is represented effectively as follows in an easy-to-use manner.

A new focus position [fc_new] can be represented with the following expression by employing a current focus position [fc_pos], focus advancing direction [fc_dir] controlled so as to readily advance to one direction in a stable manner to prevent fluctuation thereof, focus speed [fc_spd] controlled by probability to advance to that direction and operation mode of focus, and the amount of increase in the detection value, and lens vibration due to wobbling [fc_wob].

$$fc\_new = fc\_pos + fc\_spd \times fc\_dir(=1 \text{ or } -1) \pm fc\_wob$$

When the focus speed [fc_spd] controlled by the amount of increase in the detection value is small (or zero), and the lens vibration due to wobbling [fc_wob] is great, wobbling becomes a main trigger for determining the direction and speed of focus, and on the other hand, when [fc_spd] is great, and [fc_wob] is small, climbing becomes a main trigger for determining the direction and speed of focus.

Note that, as shown in FIGS. 10A and 10B, addition and subtraction of the lens vibration due to wobbling [fc_wob] is repeated in sync with the exposure cycle of the screen. FIG. 10A illustrates image frames t1, 411-t1 through t3, 413-t3 obtained at the imaging apparatus with the horizontal axis as time axis (t). A face frame 412 including a face region serving as a focal object detected by the face-detecting unit is set to each image frame.

FIG. 10B illustrates wobbling processing sequence, the horizontal axis is the same time axis (t) as that in FIG. 10A. The lens vibration due to wobbling [fc_wob] is executed as processing for vibrating the focus lens at near side and at far side, and with the example shown in the drawing, vibration of the lens is performed cyclically between [+fc_wob] and [−fc_wob], and the exposure timing of a face frame 412 central position is applied to the synchronization processing of wobbling. In other words, with each frame, wobbling control is performed such that the exposure timing of the face frame 412 central position becomes the center of plus side setting section and the center of minus side setting section at the wobbling processing.

The AF mode determining unit 353 shown in FIG. 8 performs switching control of the following modes, as described with reference to FIGS. 9 through 10B.

(a) Climbing mode wherein the focus lens is controlled from a greatly blurred state until the peak which is the maximum point of a high-frequency detection value is detected, (b) Hunting mode wherein reciprocation is repeated with high precision toward the slopes of a detection value by hunting the detection value around at the detection value focal point which is the index of contrast amount, and (c) Wobbling mode wherein AF advances to the focal point detection direction by swinging the lens backward and forward at the time of hunting and when reaching near the focus peak.

In other words, the AF mode determining unit 353 determines the autofocus mode executed by the imaging apparatus based on the evaluation value calculated by the evaluation value calculation unit 352, and performs mode switching as appropriate.

Figure 11:
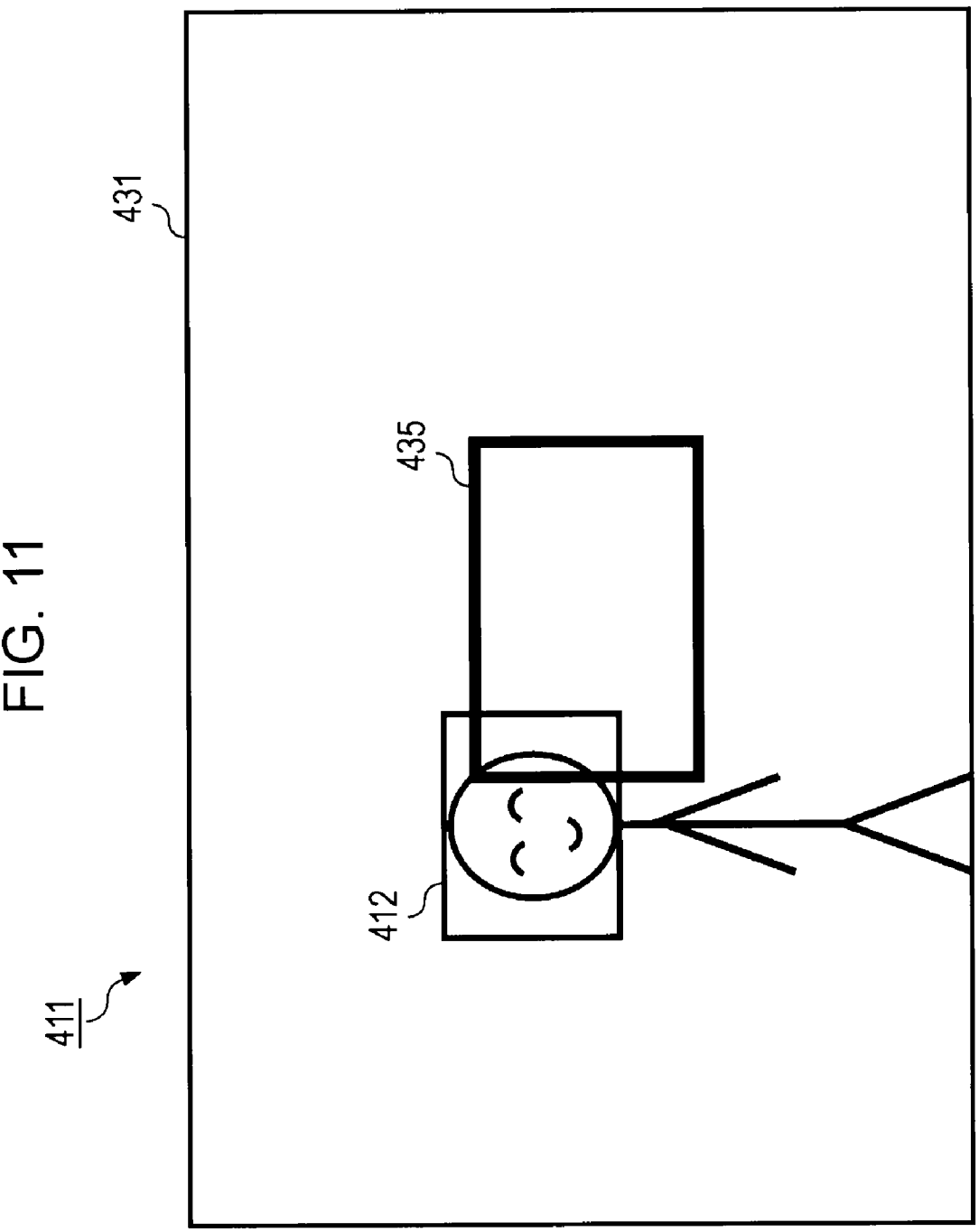
FIG. 11 is a diagram for describing various types of frame settings with the imaging apparatus.

Note that, for example, with an image frame 411 such as shown in FIG. 11, with regard to a face frame 412 and focus evaluation amount, i.e., (1) first high-frequency component Fa which can be extracted at AF speed from a blurred state, or even in a blurred state, and (2) second high-frequency component Fh from which a value is obtained only in a state closer to a focus state, in the case of matching the detection frames of these Fh and Fa, with detection processing for setting the face frame 412 and performing detection, in the case of employing a global shutter type CCD, AF processing can be performed correctly by synchronizing the actual position of the focus lens with the detection timing, but in the case of employing a rolling shutter type imaging device such as CMOS, timing wherein the center position of the detection frame of the face is read out becomes the detection timing of the center position of the face, so there is a need to perform correction regarding the detection timing and detection position.

Specifically, with timing for setting a focus position equivalent to the center position 421 of wobbling shown in FIG. 10B, there is a need to subject the phase of wobbling to correction of exposure timing with the center position of the face frame 412 as Lface, the top of the screen as Ltop, the bottom of the screen as Lbottom (however, Lbottom>Ltop), and shutter cycle as [shut_cycle] 415 such as shown in FIG. 10A. That is to say, this can be represented with the following expression.

$$Wob\_center\_new = Wob\_center + \{Lface - (Ltop + Lbottom)/2\}/(Ltop - Lbottom) \times shut\_cycle$$

Accordingly, it is desirable to control the timing of wobbling.

Note that with regard to the detection frames set as ranging areas, as shown in FIG. 11, there are at least two frames of the screen overall frame 431 for the entire screen for calculating a coring value, and the central frame 435 for extracting a central subject. The detection value of each frame is constantly calculated, and with regard to the face frame 412 which is a frame including a face, this may be employed as a frame for extracting the amount of contrast, or may be not.

Figure 1:
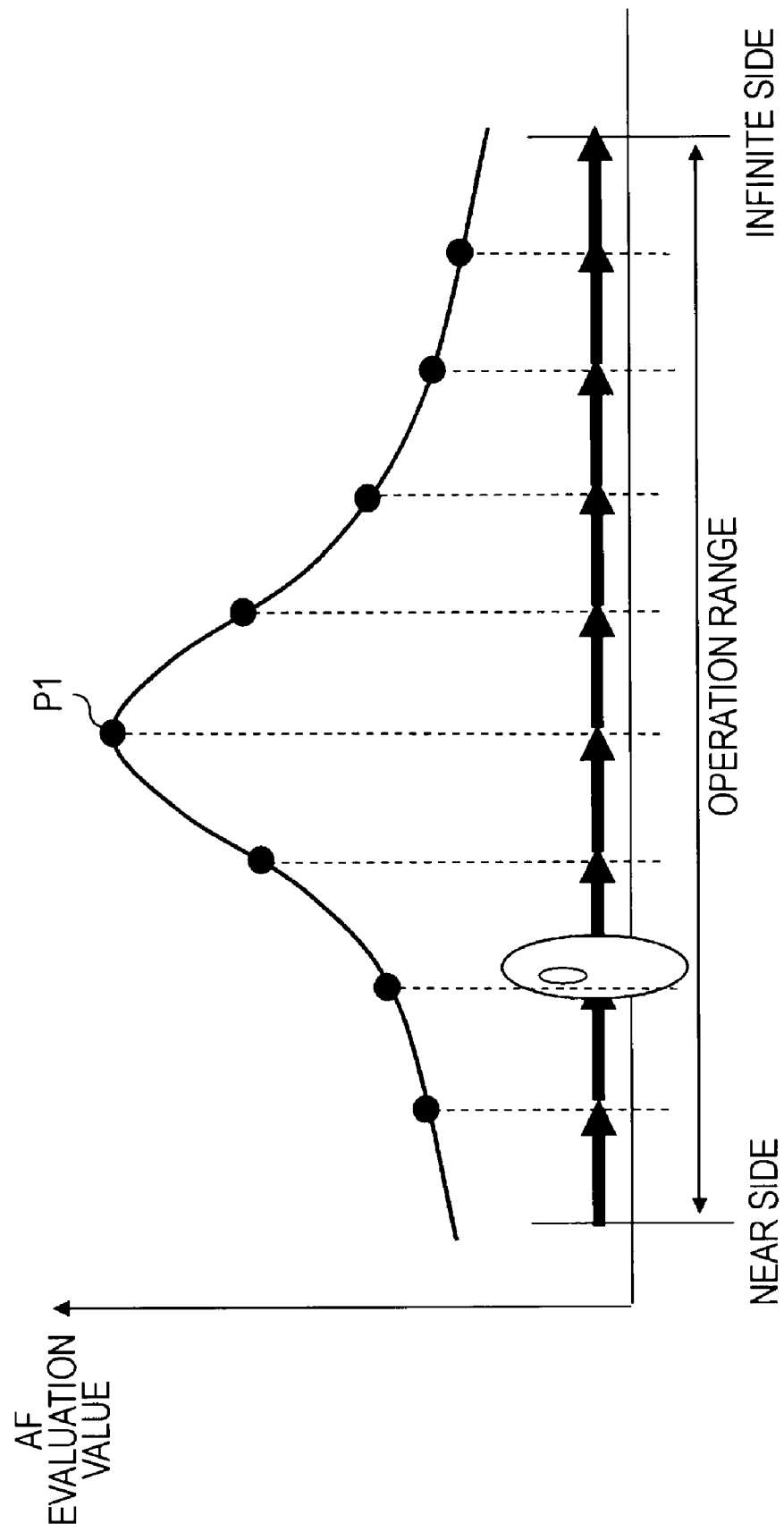
FIG. 1 is a diagram for describing a lens driving example with focus control.
Figure 2:
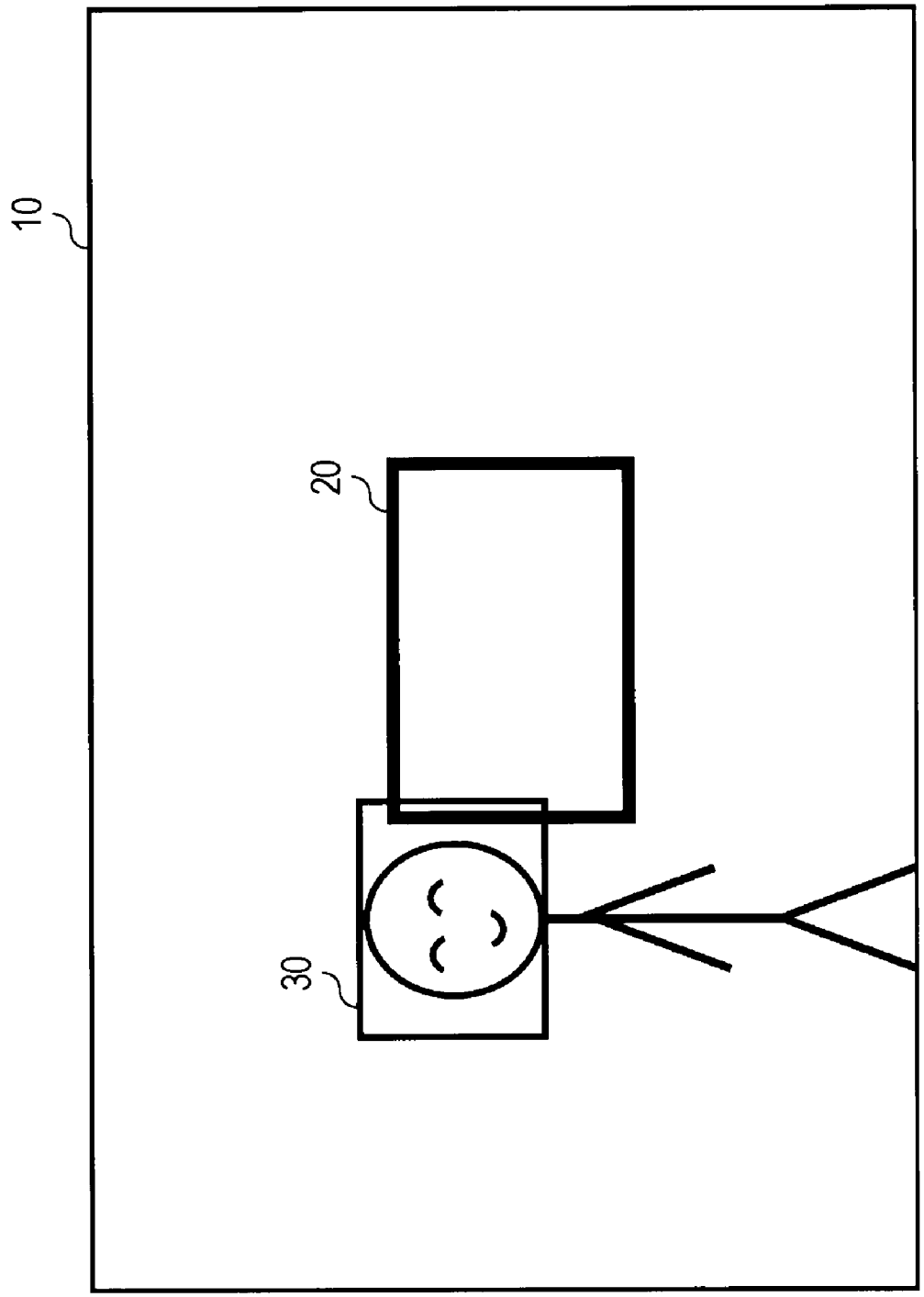
FIG. 2 is a diagram for describing settings of a detection frame with an imaging apparatus.

Note that as described with reference to FIG. 1, a camera includes a view finder (EVF) 107, and a monitor 106 for displaying a video screen employing a liquid crystal panel, and it is desirable for the camera to have an arrangement wherein not only the imaged results of the camera can be confirmed during shooting, but also whether to employ AF which puts a high priority on a face, or AF according to the related art which puts a high priority on a subject at the screen center portion can be selected.

Figure 12:
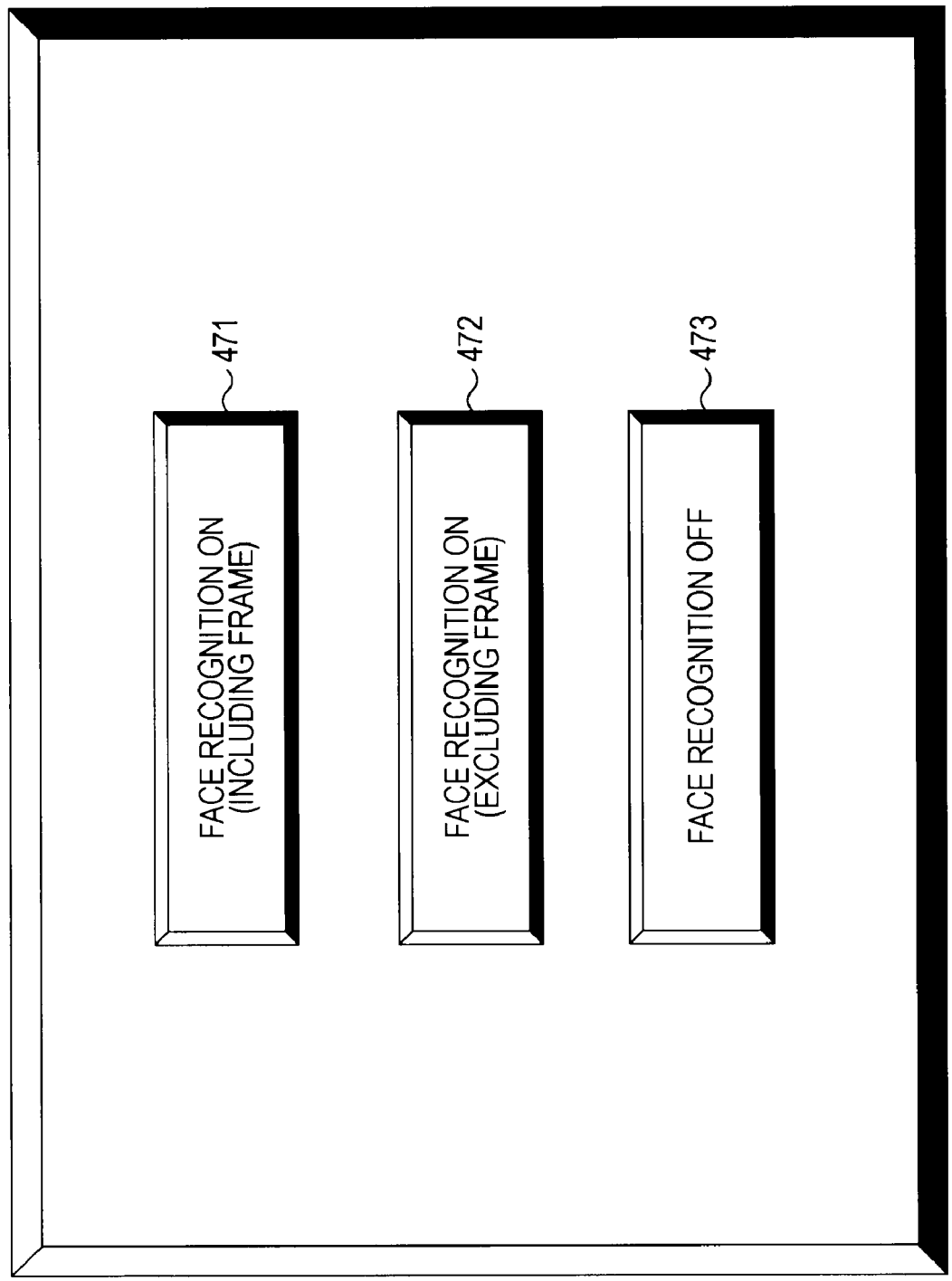
FIG. 12 is a diagram for describing a display example of a user interface with the imaging apparatus.

For example, a user interface such as shown in FIG. 12 is output to the monitor 106, and in the case of a user selecting a face recognition ON (including frame) selection portion 471, a face recognition function is activated to display a face frame on a face recognition area. In the case of the user selecting a face recognition ON (excluding frame) selection portion 472, the face recognition function is activated not to display the face recognition area. In the case of the user selecting a face recognition OFF selection portion 473, control such as employing the center preferential method according to the related art without employing the face recognition AF is executed under the control of the control unit 120.

Note that with moving image shooting, center preferential AF for preferring a subject on the center portion of the screen is commonly employed, and with professional shooting, there is a need to select a subject intentionally, so manual focus (MF) is commonly employed. In general, shooting which puts a priority on a face is frequently performed, regarding which portion of a subject needs to be enhanced depends on the cameraman's intention. Accordingly, there is always no need to put a priority on a face, so it is desirable to enable a face preferential function to be turned on/off.

Next, description will be made regarding the processing of the distance estimating unit 354 shown in FIG. 8. With the imaging apparatus according to an embodiment of the present invention, the distance estimating unit 354 employs the size (face size) of the face detected by the detection unit from a shot image face to obtain distance to the face. The basic arrangement of this processing is as previously described with reference to FIG. 6.

Now, the estimation processing of distance to a subject based on a face size will be described further in detail. The basic concept of the estimation processing of distance to a subject based on a face size is in that in the case of a face included in an image frame is small, distance to the face thereof is far, in the case of a face included in an image frame is great, distance to the face thereof is near.

As previously described with reference to FIG. 6, if the actual size of a face (Wf) is known, the distance to the face, i.e., subject distance (Df) shown in FIG. 6, i.e., subject distance (Df) from the focus lens 302 to subject position 301 can be obtained with the following Expression from the fundamental physical law regarding lenses.

$$Df = Wref \times (f/Wi) \times (Ww/Wf)$$

Wref: human face size reference value
Wi: imaging device width
f: focal distance
Wf: number of pixels having human face size within imaged image (imaging device detection value)
Ww: number of pixels having image size employed for human face detection (imaging device detection value)

If we assume a model wherein the error obtained from a face size is zero, this position is in focus when moving the focus lens to this position. Note however, as previously described with reference to FIG. 7, when various error causes are taken into consideration, an error range is set to an at near side, and set to σf at infinite side, and the distance to the face is Df, processing for setting a focus lens operation range (Rf) as follows is performed.

$$Rf = Df - \sigma n \sim Df + \sigma f \quad (1.2)$$

Examples of error causes for determining the focus lens operation range (Rf) include, as described above, movement of a focal position due to the temperature properties of a device, and hysteresis existing between various types of devices, and so forth, but with a distance (Df) calculation expression based on a face size (Wref), i.e., $$Df = Wref \times (f/Wi) \times (Ww/Wf)$$

there is a need to take errors into consideration by setting the face size (Wref) as one reference value. With the above-mentioned expression, a predetermined fixed value is employed as the human face size reference value (Wref), but the size of a face varies depending on persons, so it is desirable to make an arrangement wherein the focus lens operation range (Rf) is determined by taking a certain amount of face size into consideration. Description will be made below regarding this processing.

For example, let us say that the actual face size (lateral width L) of a face included in an image is [Lreal].

However, this real face size (lateral width L), i.e., [Lreal] cannot be obtained, so let us say that as the range of a person's face size small face width is [Lsmall], and
great face width is [Lbig].

Note that with the present example, an example employing face lateral width [L] as a face size is shown, but vertical height may be employed instead.

Figure 13:
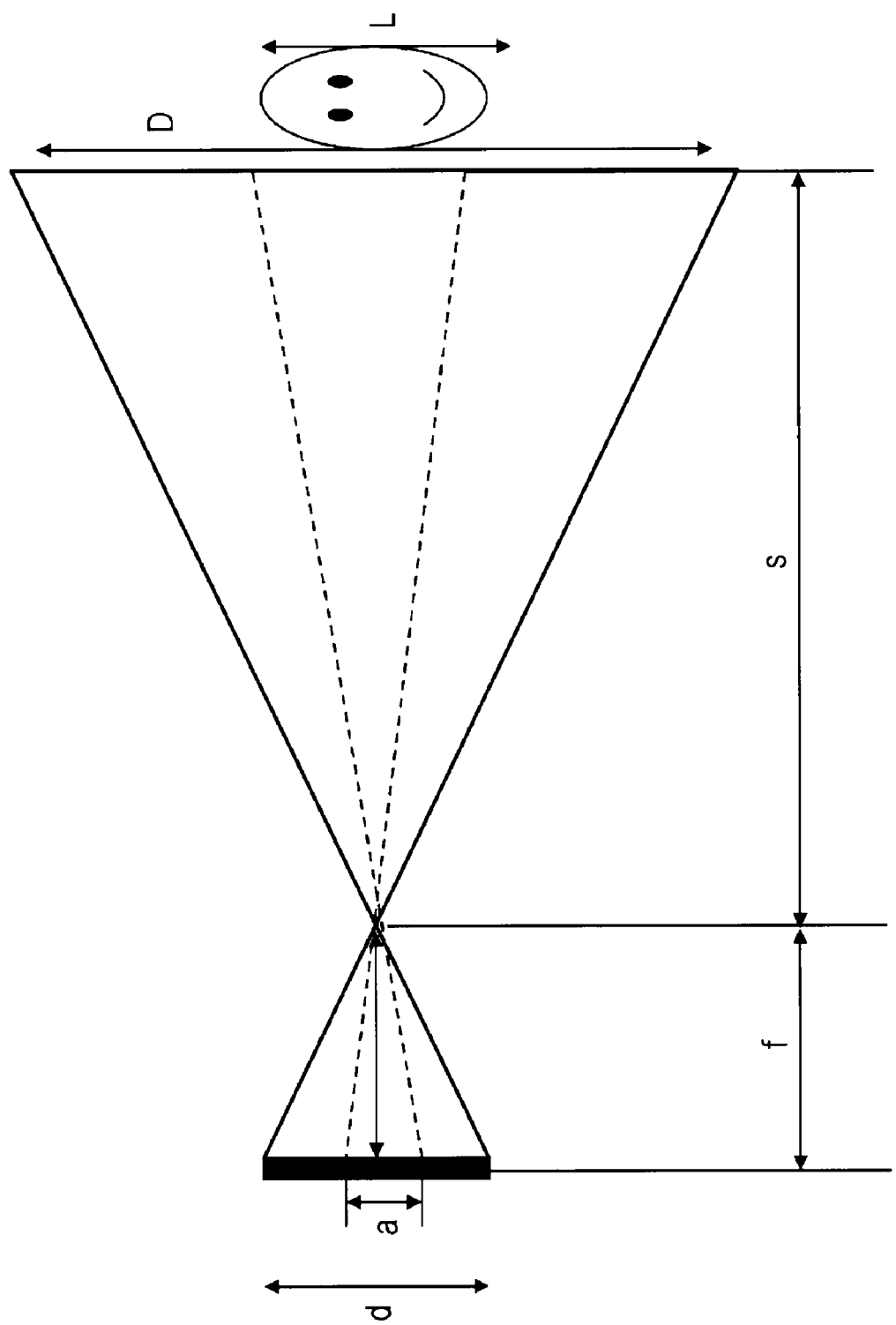
FIG. 13 is a diagram for describing distance estimation processing based on a face size.

As shown in FIG. 13, if we say that face width on the imaging device of an image to be shot by the imaging apparatus is a, the relation between actual distance s between the actual face width L and the face, the face width a of the image on the imaging device, and lens focal distance f is represented with the following expression.

$$L(\text{face width})/s(\text{distance}) = a(\text{distance on imaging device})/f(\text{lens focal distance})$$

That is to say, the distance [s] to the subject is represented with the following expression.

$$s = f \times L/a$$

The distance [s] to the subject is calculated with the above-mentioned expression.

This expression is an expression equivalent to Expression (1.1) previously described with reference to FIG. 6.

Note however, now, if we take into consideration that as the range of a person's face size small face width is [Lsmall], and
great face width is [Lbig], distance [s_small] to the subject in the case of a small face person is $$s\_small = f \times Lsmall/a,$$

and distance [s_big] to the subject in the case of a great face person is $$s\_big = f \times Lbig/a,$$

and accordingly, the following range needs to be taken into consideration as the distance to the subject.

[s_small] through [s_big]

The actual distance [s_real] corresponding to the actual shot person's face with [Lreal] is as follows.

$$s\_small < s\_real < s\_big$$

Accordingly, it is desirable to determine a focus lens operation range by setting distance [s_small] as a far side focal predicted position, and
distance [s_big] as a near side focal predicted position.

If we say that as a focus lens operation range in the case of moving the focus lens to perform focus control, near side is [Fc_near], and far side is [Fc_far], the following relation holds, Fc_near>Fc_far, and if we say that a function for obtaining a focal position from distance is Fc(s), the following relation holds.

Fc_near>Fc(s_big)>Fc(s_small)>Fc_far

Now, the setting data of a new section to be set as a focus lens operation range, i.e., two points of near side limit [Fc_near_new], and
far side operation limit [Fc_far_new] can be calculated with the following expressions.

$$Fc\_near\_new = MAX(MIN(Fc\_near, Fc(s\_big)), Fc\_far), \text{ and}$$

$$Fc\_far\_new = MIN(MAX(Fc\_far, Fc(s\_small)), Fc\_near).$$

Figure 14:
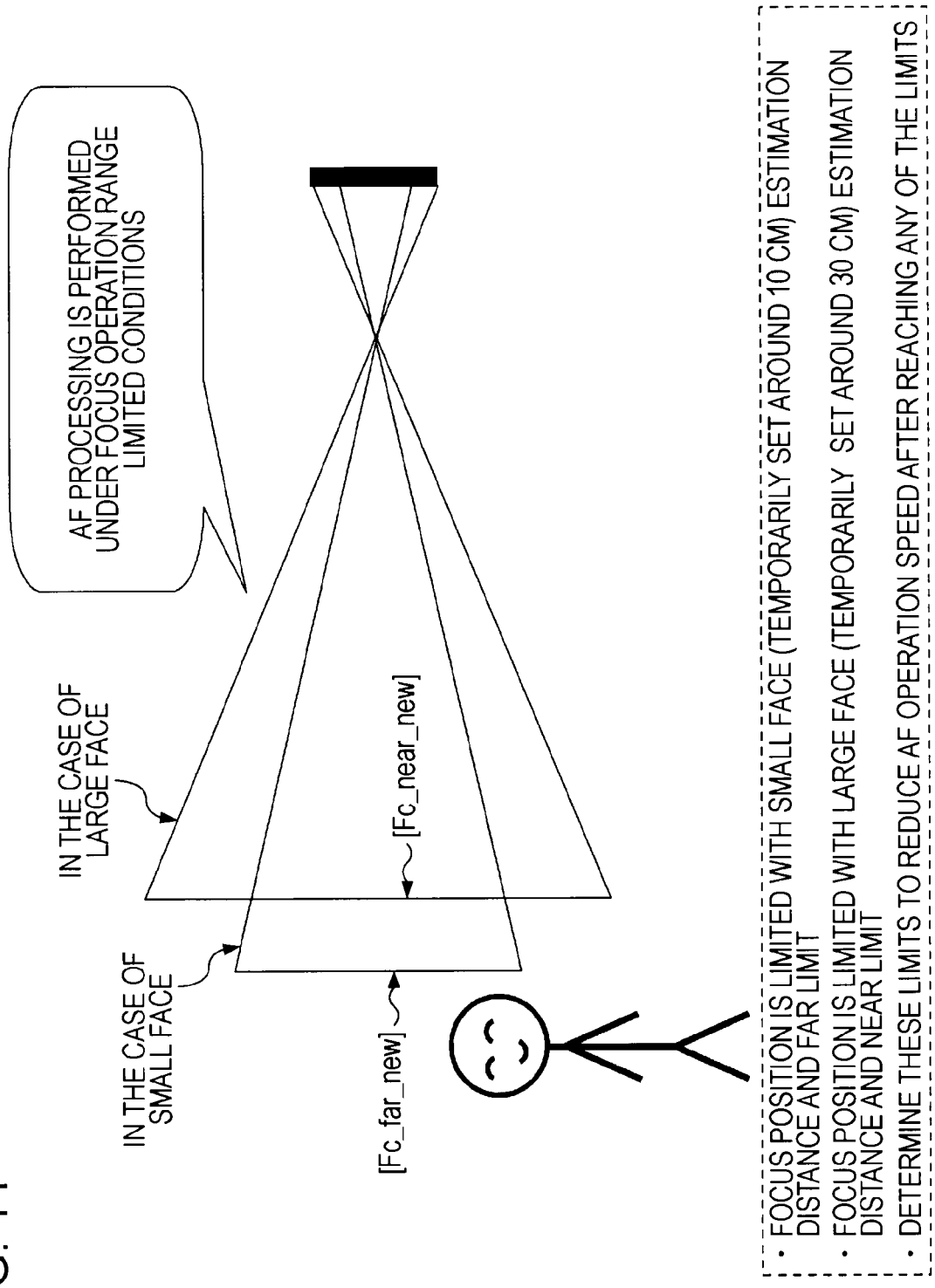
FIG. 14 is a diagram for describing setting processing a near side operation limit [Fc_mear_new] through a far side operation limit [Fc_far_new] employing distance estimated information based on a face size.

Thus, a range of near side limit [Fc_near_new] through far side operation limit [Fc_far_new]

is set as a focus lens operation range again, thereby realizing distance estimation moving image AF as to the face selected as a focal object. Consequently, the range of near side limit [Fc_near_new] through far side operation limit [Fc_far_new] is set, such as shown in FIG. 14. That is to say, autofocus processing is executed under control such that the far side limit [Fc_far_new] is set to the estimated distance of a small face (around 10 cm is temporarily set), and the near side limit [Fc_near_new] is set to the estimated distance of a great face (around 30 cm is temporarily set) to restrict the movement range of the focus lens, move the focus lens within these limit ranges, and slow down AF operation speed at around the limits.

Note that if more correct face size data is obtained, correct distance information is obtained, and accordingly, it is desirable to employ an arrangement wherein the face attributes estimated based on the feature information of the detected face, e.g., face attributes such as whether the person is an adult or child, age, sex, and so forth are employed to further restrict face size range.

Also, in a case wherein distance to a subject is estimated to determine a focus lens operation range, it is desirable to perform settings in light of other error causes. For example, it is desirable to determine a focus lens operation range in light of depth of field. In this case, processing is performed wherein, when focusing on a subject having arbitrary distance, depth of field includes leading edge and trailing edge, a focus limit position is set to the position (near side) closer to the distance estimated with the great face Lbig by the focal depth worth, and a focus limit position is set to the position (far side) far away from the distance estimated with the small face Lsmall by the focal depth worth.

In general, depth of field depends on focal distance, aperture, and permissible circle of confusion, and specifically, is calculated as follows. Here, distance (hereafter, referred to as "hyperfocal distance") is calculated such that infinite distance is included just in the trailing edge of focal depth when focusing on a subject.

If we say that
hyperfocal distance is H,
lens focal distance is f,
lens aperture value is N, and
diameter of permissible circle of confusion is c,
the relation thereof is $$H=f^2/Nc.$$

Next, each of the leading edge and trailing edge of depth of field when focusing on a subject having arbitrary distance is calculated.

If we say that subject distance is s, a focus limit position which is the position (near side) closer to the distance estimated with the great face Lbig by the focal depth worth is Dn(s), and a focus limit position which is the position (far side) far away from the distance estimated with the small face Lsmall by the focal depth worth is Df(s), Dn(s) and Df(s) can be obtained with the following expressions.

$$Dn(s)=s(H-f)/(H+s-2f)$$

$$Df(s)=s(H-f)/(H-s)$$

If we say that the lateral length of the subject's face is L, and the error of the length itself is ΔL, it is desirable to set min Dn(s) through max Df(s) to a focus limit range, and add a margin thereto to determine a focus operation range. For example, an arrangement may be made wherein there is a need to perform distance estimation based on the face of an adult after growth, provide a distance error margin on small face side, and estimate distance in such a state.

The distance estimating unit 354 shown in FIG. 8 sets a focus lens operation range using such a method, and with this set range, control of the focus lens is performed based on various types conditions determined by the focus direction determining unit 355 and deceleration and acceleration condition determining unit 356, whereby focus control for maintaining focus as to a specific subject's face is executed.

Note that in the case of multiple faces being included in an image shot by the imaging apparatus, there is a need to select a face to be focused (principal subject).

A principal subject is selected based on, for example, information such as a face size, nearness from the center of a face, whether this has been an object to be detected, and so forth. Unlike still images, there is few opportunities wherein a small face is a principal subject, but there is a great number of opportunities wherein a greater face is a principal subject, and accordingly, only a face having a sufficient great size is selected as a principal subject's face and as a detection target using center preferential AF.

Description will be made regarding a specific setting processing example of face priority order.

A face priority order setting score [P] is calculated based on the following expression.

$$P=[\text{face size}]\times[Wi]+[\text{distance from center of face image}]\times[Wj]+[\text{additional points depending on whether or not the face has been detected as a principal subject last time}: S]$$

The priority order setting score [P] of each face is calculated in accordance with the above-mentioned expression.

Wi and Wj are weight parameters as to [face size] and [distance from center of face image].

A face having a high score calculated in accordance with the above-mentioned expression is selected as a subject's face serving as a focal object. Note that with a moving image, there is a need to execute score calculation for each frame or for each frame with a predetermined interval, and switch a preferential subject according to the calculated score. In this case, the weight parameter [Wi] corresponding to [additional points depending on whether or not the face has been detected as a principal subject last time: S] and [face size] is sufficiently increased, whereby stable processing can be performed.

Note that the control unit 120 manages importance of subjects, appearance time, and so forth based on face estimated distance. Examples to be managed are: face ID, face width, face estimated distance, importance (score) of a subject, appearance time as a principal face, appearance time, and appearance frequency.

The focus direction determining unit 355, deceleration and acceleration condition determining unit 356 perform control of a focus lens within the focus lens operation range set by the distance estimating unit 354, and generate data for performing focus control for maintaining focus as to a specific subject, i.e., for tracking a principal subject. Description will be made below regarding multiple algorithm examples of a principal subject tracking algorithm.

First Algorithm

A first algorithm is a principal subject tracking algorithm which puts importance on consecutiveness of principal faces.

Figure 15:
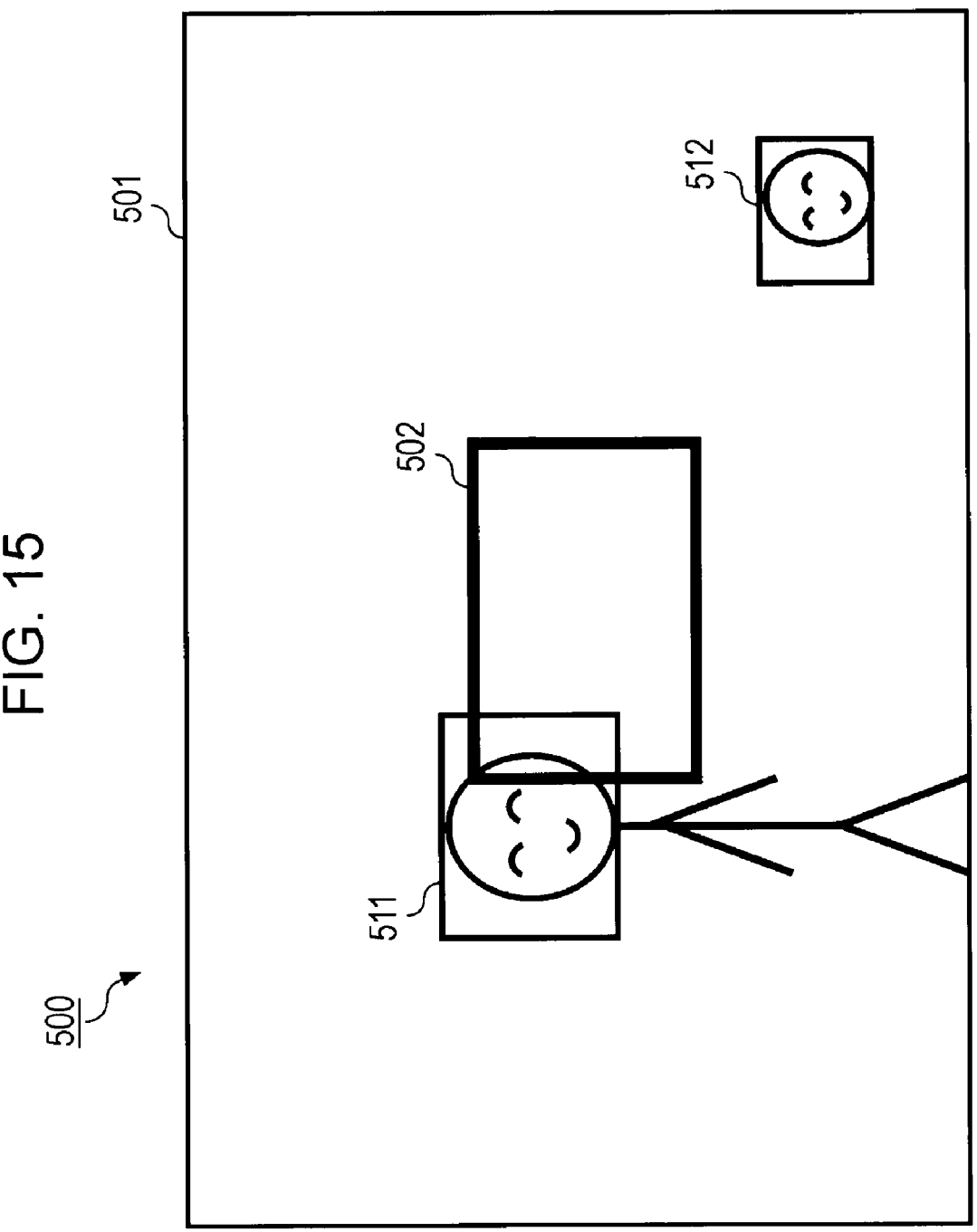
FIG. 15 is a diagram for describing various types of frame settings with the imaging apparatus.

In a case wherein a face having the highest face priority order setting score [P] described above has been selected as a principal subject, and an image frame 500 such as shown in FIG. 15 has been obtained, only a face frame 511 including a central frame 502 set at the center of an image overall frame 501 is employed as a face region. A face frame 512 not including the central frame 502 is not employed.

Note that even if a part of face frame deviates from the central frame 502, or a face size is reduced, the face is tracked. Search of a face is started again at the time of the face frame deviating from the central frame 502 completely, the largest face of the face frames including an overlapped region as to the central frame 502 is tracked as a subject. In the case of missing the face, the usual central frame 502 is employed as a region to be focused.

Second Algorithm

A second algorithm is a principal subject tracking algorithm which puts importance on appearance time as a principal face.

With the example shown in FIG. 15, the largest face wherein a part of the face frame is included in the central frame 502 is selected as a principal subject. The face is tracked until a part of the face frame is deviated from the central frame 502, or a face of which the appearance duration as a principal face is long appears in the central frame. The face having the longest appearance duration as a principal subject is tracked.

Third Algorithm

A third algorithm is a principal subject tracking algorithm wherein tracking of a principal face is performed in combination with central precedence in an easy-to-use manner.

With this algorithm, simply, autofocus (AF) with central precedence is performed, and when a face appears within the central frame 502 with a certain size or more, the face is tracked, and in the case of a larger face appearing in the central frame, the latter face is recognized as an object to be tracked.

The focus direction determining unit 355, and deceleration and acceleration condition determining unit 356 shown in FIG. 8 generate, for example, control data for tracking a principal subject in accordance with any of the above-mentioned algorithms. Note that at the time of generation processing of this control data for tracking a principal subject, data generation is performed, which follows a condition that focus lens control is performed within the focus lens operation range set by the distance estimating unit 354.

Description will be made with reference to the flowcharts shown in FIGS. 16 through 19 regarding processing sequence relating to focus control executed by the imaging apparatus according to an embodiment of the present invention.

First, before description of the flowcharts, description will be made regarding the features of focus control executed by the imaging apparatus according to an embodiment of the present invention as a whole. With the imaging apparatus according to an embodiment of the present invention, the face of a specific subject is detected from moving image shot frames, and focus control is performed so as to maintain focusing as to the face thereof. With this processing, search of a focal point is performed based on contrast intensity measurement, distance estimated information from the camera to the face based on the face size of the detected face is applied, and limits are set as to the movement range of a focus lens, thereby enabling high-speed focal point determination.

With distance estimation based on a face size, in order to perform correct distance estimation, it is ideal to obtain the actual precise size information of a subject's face, but it is difficult to tell the actual face size in an actual shooting process. Accordingly, it is desirable to employ an arrangement wherein based on the feature information obtained from a face image at the time of face detection, estimation is made regarding whether a subject's face is an adult or child, or doll, photo, child, baby, or the like, or an age is estimated, thereby employing face size information registered in the imaging apparatus corresponding to the estimation information thereof. In the case of a common user employing a video camera, shooting of a baby or child is frequently performed, and in the case of employing a baby as a subject, it is desirable to determine that the subject is a baby based on the feature information of the detected face, and perform distance estimation to the face by applying small face size information.

Note that as an arrangement wherein not only an age but also regarding whether or not a subject is a person are determined from the movement of the subject, an arrangement may be made wherein actual person's face information and the other face information are distinguished, and an actual face alone is selected as a focal object. As determination processing regarding whether or not a subject's face is a person's face, for example, an arrangement may be made wherein the movement of parts of a face is detected, and in the case of the parts resting for a given length of time, determination is made that the subject's face is a person's face.

Note that with the imaging apparatus according to an embodiment of the present invention, an arrangement is made wherein search of a focal point is performed based on contrast intensity measurement, distance estimated information from the camera to the face based on the face size of the detected face is applied, and limits are set as to the movement range of a focus lens, thereby enabling high-speed focal point determination, but for example, with contrast measurement according to a detection frame, there is a possibility that no peak is found immediately, and in this case, focusing processing results in failure.

In the case of focusing on a principal face serving as a focal object to solve such a problem, an upper limit is set to peak detection time within the focus limit range set as a focus lens movement range set in accordance with the estimated distance based on a face size. Also, an arrangement may be made wherein cancellation of a focus limit is performed after a certain period of time since a peak was missed.

Also, an arrangement may be made wherein control employing a focus limit is set to be effective only in the case of a face serving as a focal object being in the vicinity of the subject distance already detected within a preceding frame, and in the case of the face being away from the neighborhood of the detected subject distance, processing for canceling the control employing a focus limit. As similar concept, an arrangement may be made wherein peak detection of an evaluation value based on contrast intensity is performed multiple times repeatedly while inverting the far side edge and near side edge of focus within the limit, and in the case of no peak being detected even with this processing, the focus limit already set is cancelled. Alternatively, an arrangement may be made wherein the range of a focus limit is gradually extended.

In the case of no peak being sufficiently obtained within a certain period of time (specifically, in the case of a condition not being satisfied wherein the ratio between a high-frequency detection value and a lower high-frequency detection value is equal to or greater than a certain value with the value obtained by subtracting a coring value from a detection value at a detection setting area for faces), the focus limit is cancelled.

Note that examples of an opportunity wherein the focus limit set as the focus lens movement range set in accordance with the estimated distance based on a face size is cancelled include a case wherein a face is missed, a case wherein another subject interrupts in front of a face, and a case wherein a face itself is not set to an object to be recognized, and the limit is cancelled.

In such a case, when the focus lens position of a subject stopped as the peak enters within the estimated distance of face distance, the focus limit is set again.

In particular, in the case of a subject serving as a focal object moving, many cautions are needed. An insufficient detection cycle for extracting a face makes it difficult to perform tracking of a face. Also, even in the case of a face being tracked sufficiently, when a user operates a camera to perform processing, for example, such as panning, tilting, zooming, or the like, tracking delay can readily occur. Further, if the face frame deviates from the screen central portion, the face thereof is subjected to frameout during zooming in some cases, so it is desirable to cancel the focus limit range set based on a face size during zooming, panning, and tilting operation.

For example, the control unit inputs acceleration (gyro) sensor information for shaking correction, movement itself of face detection frame, operating information of a zoom lever, or the like, and according to such input, performs processing for canceling the focus limit range set based on a face size, or alleviating the limit.

Description will be made regarding a focus limit cancellation processing example in a case wherein the control unit inputs a face detection frame, i.e., the movement information of a face frame set as an acquisition region of a detection value (AF evaluation value) corresponding to a face region, and this movement is equal to or greater than a specified value (threshold).

The control unit 120 calculates, for example, the movement amount average of a face frame (detection frame) for a given length of time set beforehand regarding an input frame, the ratio as to the size of the face frame [face frame movement amount average/face frame size], and compares this calculation result and a threshold [Mv_th] set beforehand. Specifically, with a frame section during a given length of time set beforehand, in the case of the following expression being satisfied, movement amount average/face detection frame size<$Mv\_th$ the control unit 120 employs the focus limit set based on the face size continuously, but in the case of the above-mentioned expression not being satisfied, performs processing for canceling the focus limit or alleviating the limit.

Similarly, the control unit 120 determines occurrence of zooming, panning, and tilting processing based on input of the operating unit or shaking correction gyro or the like, and in the case of such an operation being performed, performs processing for canceling the focus limit or alleviating the limit.

Note that with moving image shooting, a face size varies, so the control unit also changes a face frame size for obtaining a detection value according to a face size, and further, evaluates a detection value by taking into consideration the face frame size as well. Also, the distance information obtained from the detection frame is estimated with the value obtained by smoothing change in a face size by a low-pass filter as a center value. With regard to fluctuation of a face frame which is an estimation error of a face size, an arrangement may be made wherein a near side limit position is estimated with estimated distance (including limits of a far side F1 and near side N1) at a smaller size of the past time of several V (V=60 Hz through 50 Hz), specifically, around 4 V, a far side limit position is estimated with greater side estimated distance, the limit operation range is narrowed down, thereby enhancing convergence of the limit as to an unstable object.

Figure 16:
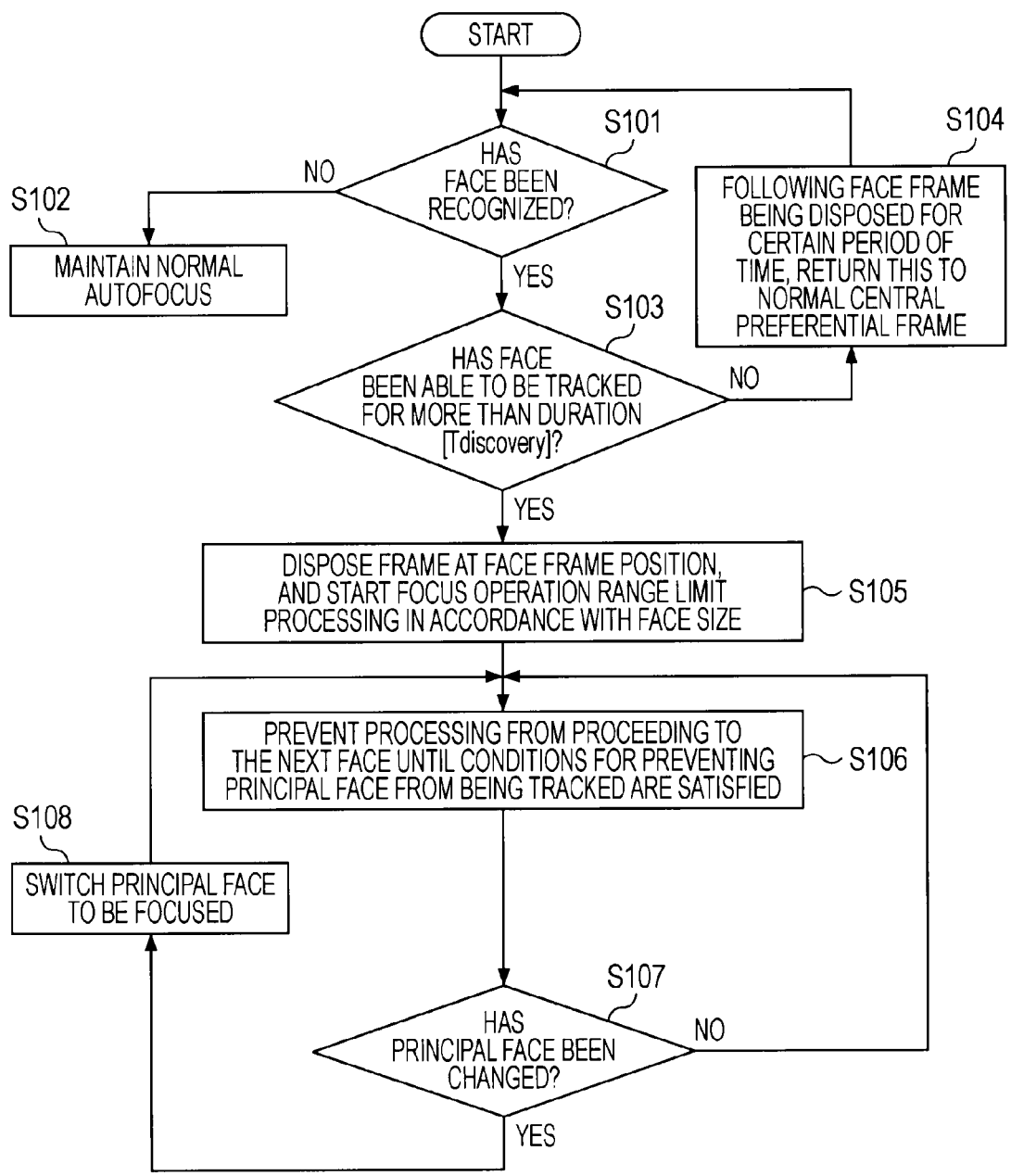
FIG. 16 is a diagram illustrating a flowchart for describing processing sequence executed at the time of the initial settings of a face frame including a subject face to be focused, i.e., a face frame to be set as a ranging area.

Description will be made with reference to the flowchart shown in FIG. 16 regarding the sequence of processing executed at the time of initial settings of a face frame including the face of a subject to be focused, i.e., a face frame to be set as a ranging area. Note that the flow shown in FIG. 16 is executed under the control of the control unit 120.

First, in step S101, the control unit 120 inputs face detection information from the face-detecting unit 200, and determines whether or not a face is detected within a frame. In the case of no face being detected, the control unit 120 proceeds to step S102, and performs usual autofocus processing, i.e., autofocus processing based on contrast intensity, for example, using a detection value (AF evaluation value) of a central frame set at the center portion of a screen.

On the other hand, in the case of determination being made in step S101 that a face is detected within a frame, the control unit 120 proceeds to step S103, determines whether or not tracking of the face has been succeeded for predetermined stipulated duration [Tdicovery] or longer, and in the case of tracking having not been succeeded, the control unit 120 proceeds to step S104, and in the case of a face frame as to the detected face having been set, maintains the face frame, and performs autofocus processing based on contrast intensity employing a detection value (AF evaluation value) of the central frame.

On the other hand, in the case of determination being made in step S103 that tracking of the face has been succeeded for predetermined stipulated duration [Tdicovery] or longer, the control unit 120 proceeds to step S105, sets a face frame as to the detected face, and regards this as a detection frame (frame for AF evaluation value calculation). Further, the control unit 120 executes distance estimation based on the face size, and sets a focus limit for narrowing down the upper and lower limits of a focus movement range based on the estimated distance.

That is to say, the control unit 120 sets a focus lens operation range based on usual contrast intensity to a certain range before and after generally centered on the estimated distance based on the distance estimated information. Specifically, as previously described with reference to FIG. 5B, the control unit 120 sets a region including a predetermined error range centered on subject distance estimated information (DF) based on the size of a person's face serving as a target subject as a focus lens operation range (Rf), moves the focus lens only within this operation range (Rf), and starts processing for determining a contrast level to determine a focus position.

In step S106, the control unit 120 executes tracking processing by fixing a principal face set as a focal object. Note that any of the above-mentioned first through third algorithms is applied to selection of a principal face. That is to say, the control unit 120 executes any of the following algorithms to select a principal face.

The first algorithm for selecting a face having the maximum priority order setting score [P] and including a central frame as a principal face, the second algorithm for preferentially selecting a face as a principal face, which has long registration duration as a principal face, and follows a principle wherein a face including the central frame is selected as a principle face, and the third algorithm for selecting a face which has appeared with a certain size or more at the time of center preferential autofocus (AF) being performed as a principal face.

The control unit 120 thus executes tracking of a principal face set once, and in the case of tracking being succeeded, continues processing with the principal face thereof as a focal object, but in the case of tracking resulting in failure, executes processing for selecting the next principal face.

In the case of a principal face change condition occurring during the above-mentioned algorithm being executed in step S107, such that tracking of the principal face results in failure, the control unit 120 proceeds to step S108, changes the principal face serving as a focal object, returns to step S106, and performs processing with the changed principal face as a focal object.

Note that in the case of a principal face change condition occurring such that tracking of a principal face results in failure, the control unit 120 executes processing for changing a principal face serving as a focal object, but examples of specific principal face change conditions include detection of movement of a screen or face frame which is equal to or greater than a predetermined threshold, and input of operating information of one of zooming, panning, and tilting.

Specifically, with the execution period of focus control within the setting limit based on the subject distance calculated by using the face detected by the face-detecting unit 200, in the case of detecting movement of the screen or face frame which is equal to or greater than a predetermined threshold, or detecting input of operating information of one of zooming, panning, and tilting, the control unit 120 performs processing for canceling or alleviating the above-mentioned limit.

Figure 17:
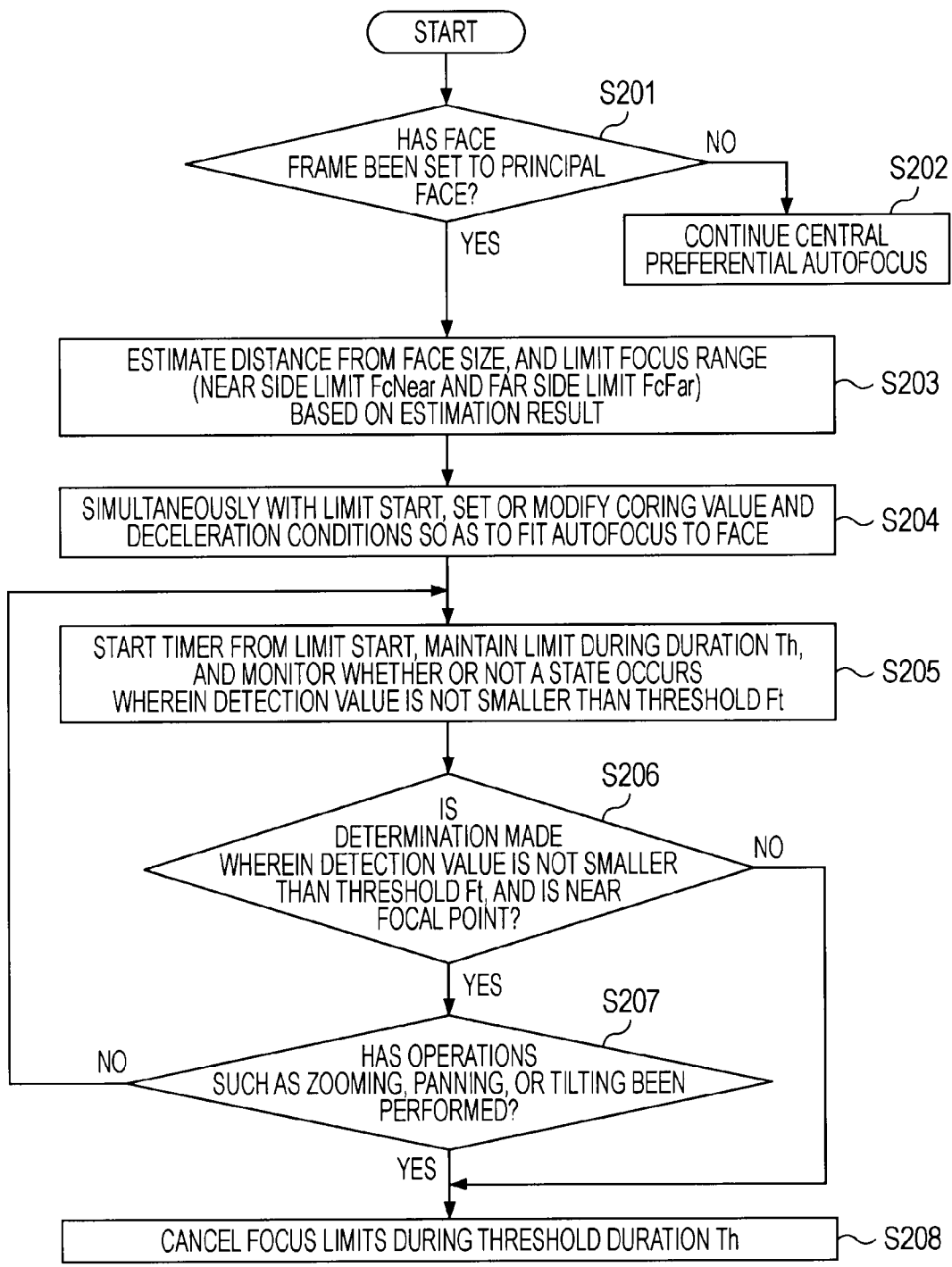
FIG. 17 is a diagram illustrating a flowchart for describing the setting and cancellation of focus limits based on distance information up to a subject calculated based on a face size, and the sequence of focus control processing based on the focus limit setting.

Next, description will be made with reference to the flowchart shown in FIG. 17 regarding the sequence of focus control processing based on the settings and cancellation of focus limits based on the distance information to a subject calculated based on a face size. Note that the flow shown in FIG. 17 is executed under the control of the control unit 120.

First, in step S201, the control unit 120 determines whether or not a face frame has been set to a principal face. In the case of no face frame having been set, the control unit 120 proceeds to step S202, and performs usual autofocus processing, i.e., autofocus processing based on contrast intensity, for example, employing a detection value (AF evaluation value) of the central frame set at the central portion of the screen.

In the case of determination being made in step S201 that a face frame has been set to a principal face, the control unit 120 proceeds to step S203. In step S203, the control unit 120 performs estimation of distance to the face thereof from the size of the face, and applies limits (near side limit FcNear and far side limit FcFar) to the focus range.

Next, in step S204, at the same time as start of focus control based on the settings of focus limits, the control unit 120 sets or modifies a coring value and deceleration conditions so as to match AF to the face. For example, as described with reference to FIG. 14, the control unit 120 executes autofocus processing such as control wherein the far limit is set to the estimation distance of a small face (around 10 cm is set temporarily), the near limit is set to the estimation distance of a large face (around 30 cm is set temporarily), the focus lens movement range is restricted, the focus lens is moved with this limit range, and AF operation speed is slowed down near the limits.

That is to say, as previously described with reference to FIG. 5B, this processing is processing wherein with the subject distance estimated information (DF) based on the face size of a person serving as a target subject as the center, a range including a predetermined error range is set as the focus lens operation range (Rf), the focus lens is moved only with this operation range (Rf), a contrast level is determined, thereby determining a focus position.

Next, in step S205, the control unit 120 starts a timer at the same time as start of focus control based on focus limit settings, maintains the focus limits for predetermined stipulated duration [TimeTh], and monitors whether or not a state wherein the detection value (AF evaluation value) obtained from the face frame becomes a threshold (Ft) or more occurs within this duration [TimeTh].

In step S206, the control unit 120 determines whether or not the detection value becomes the threshold (Ft) or more, and the detected position is determined as near a focal point, and in a case wherein the detection value does not become the threshold (Ft) or more, and the detected position is not determined as near a focal point, proceeds to step S208, and after elapse of the predetermined stipulated duration [TimeTh], cancels the focus range limits (near side limit FcNear, far side limit FcFar) set in accordance with the distance estimated information based on the face size set in step S202.

In a case wherein determination is made in step S206 that the detection value becomes the threshold (Ft) or more, and the detected position is determined as near a focal point, the control unit 120 maintains the focus range limits (near side limit FcNear, far side limit FcFar) set in accordance with the distance estimated information based on the face size to perform focus control, performs tracking of a principal face, and continues focus control. In a case wherein determination is made in step S207 that operations have been performed, such as zooming, panning, or tilting, the control unit 120 proceeds to step S208, and cancels the focus limits.

Thus, when the face frame is set to the principal face, the control unit 120 applies the focus operation range limits to both of far side and near side from the face size, starts the timer Th from the start of the limits, and sets the focus limits until focal point conditions are not satisfied with (1) zooming, (2) panning, tilting, and (3) certain duration as cancellation conditions. When the limit conditions are cancelled, the control unit 120 enters relock operation of the face as long as the face is continuously detected.

Figure 18:
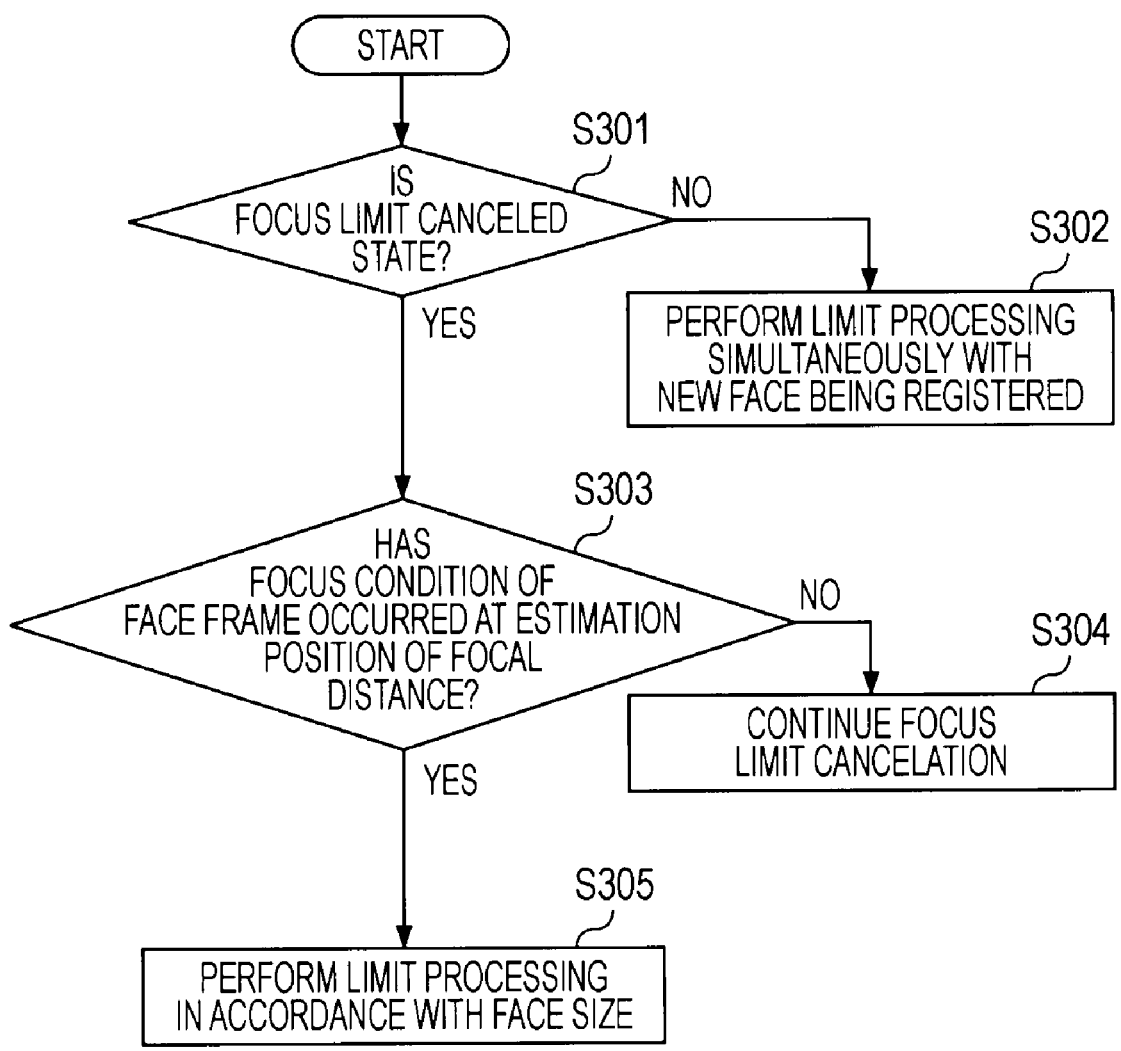
FIG. 18 is a diagram illustrating a flowchart for describing focus limits to be set in accordance with distance estimated information based on a face size, i.e., movement limit (near side limit FcNear and far side limit FcFar) state update processing of a focus lens.

Next, description will be made with reference to the flowchart shown in FIG. 18 regarding state update processing of focus limits to be set in accordance with the distance estimated information based on a face size, i.e., the focus lens movement limits (near side limit FcNear, far side limit FcFar). Note that the flow shown in FIG. 18 is executed under the control of the control unit 120.

First, in step S301, the control unit 120 determines whether or not the current state is a focus limit cancellation state, i.e., a state wherein the focus limits to be set in accordance with the distance estimated information based on a face size has not been set. In the case of a state wherein the focus limits having been set, the control unit 120 proceeds to step S302, and in response to detection of a new face, regards the face thereof as a principal face serving as a focal object to execute the distance estimation based on the face size, and sets the focus limits, i.e., the focus lens movement limits (near side limit FcNear, far side limit FcFar) in accordance with the distance estimated information.

On the other hand, in a case wherein determination is made in step S301 that the current state is a focus limit cancellation state, i.e., a state wherein the focus limits to be set in accordance with the distance estimated information based on a face size has not been set, the control unit 120 proceeds to step S303, determines whether or not the focus conditions have satisfied with the face frame at the focal distance estimated position. This processing is processing for determining whether or not the detection value (AF evaluation value) obtained from the face frame set corresponding to a person's face serving as a target subject becomes the threshold (Ft) or more, and a focus state is confirmed.

In the case of a focus state being confirmed, the control unit 120 proceeds to step S305, executes the distance estimation based on the face size, and sets the focus limits, i.e., the focus lens movement limits (near side limit FcNear, Far side limit FcFar) in accordance with the distance estimated information.

On the other hand, in the case of no focus state being confirmed with the determination in step S303, the control unit 120 proceeds to step S304, and continues usual focus control wherein the focus limits in accordance with the distance estimated information based on a face size have not been set.

Thus, as the execution result of the usual contrast AF, when the focus conditions are satisfied at the current focus position, in the case of the distance range estimated from the face size including the face, the control unit 120 executes focus control wherein the focus limits in accordance with the distance estimated information based on the face size have been set. Note that at the same time as start of using the focus limits, the control unit 120 controls and reduces the coring value equivalent to the above-mentioned noise suppression quantity, tightens the AF deceleration conditions, suppresses fluctuation of AF, and performs control so as to be readily focused. Note that in a case wherein the distance estimation using a face size cannot be readily performed, an arrangement may be made wherein when the focus position reaches a distance estimation area, and a principal subject exists at the center portion, the control unit 120 performs processing for reducing the coring value to slow down the processing speed of focus control.

Figure 19:
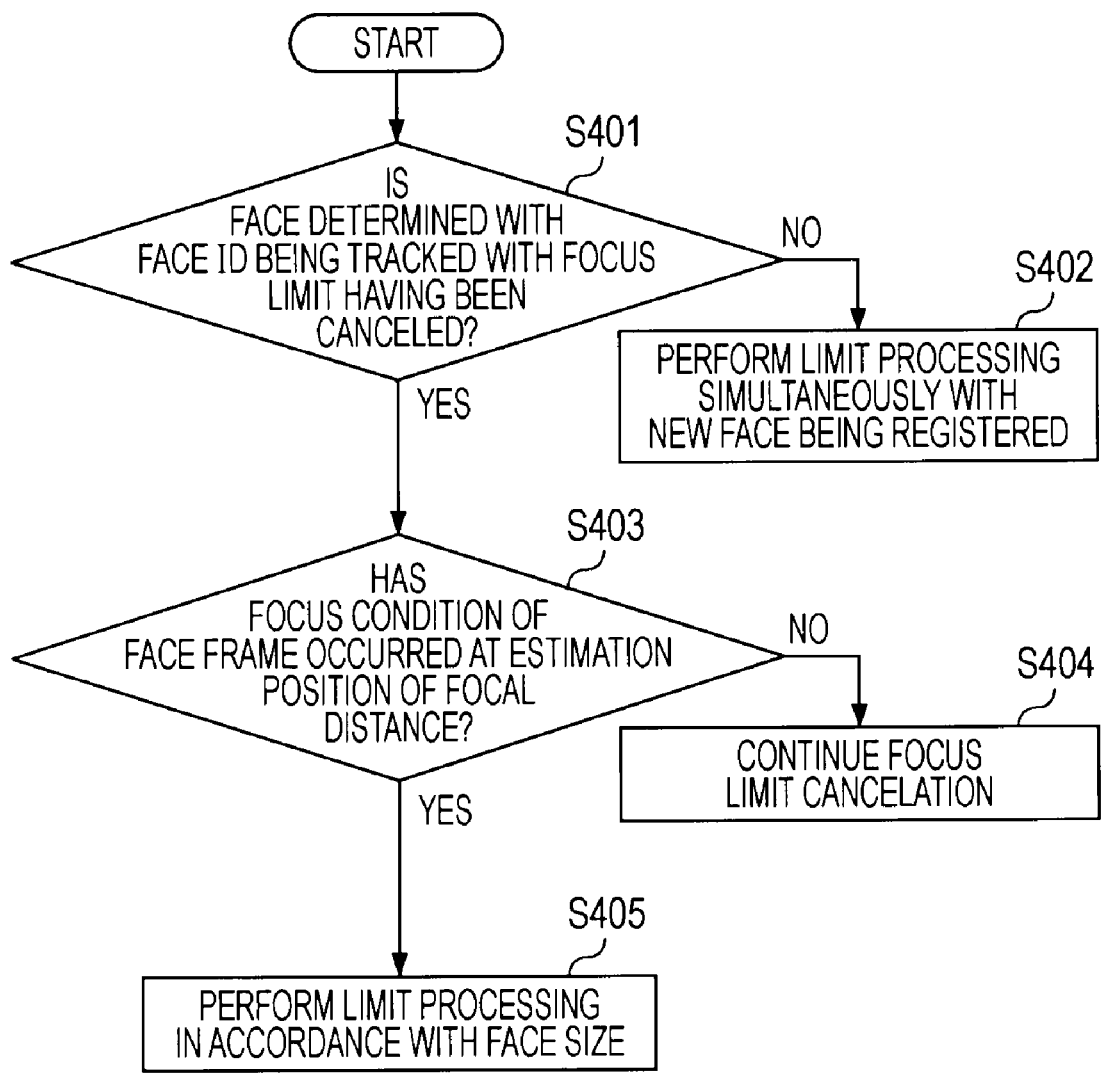
FIG. 19 is a diagram illustrating a flowchart for describing focus limits to be set in accordance with distance estimated information based on a face size, i.e., movement limit (near side limit FcNear and far side limit FcFar) state update processing of a focus lens.

FIG. 19 is, similar to FIG. 18, a flowchart for describing state update processing of focus limits to be set in accordance with the distance estimated information based on a face size, i.e., the focus lens movement limits (near side limit FcNear, far side limit FcFar).

The difference as to the flowchart shown in FIG. 18 is step S401, the processing in steps S402 through S405 is the same as the processing in steps S302 through S305 of the flowchart shown in FIG. 18. With an example of the present processing, in step S401, the control unit 120 determines whether or not the current state is the focus limit cancellation state, i.e., a state wherein the focus limits to be set in accordance with the distance estimated information based on a face size have not been set, and also determines whether or not tracking of a face is being performed. That is to say, in step S401, the control unit 120 tracks the specific face distinguished with the face identifier (ID) obtained beforehand, and determines whether or not the tracked face thereof is the face employed for the setting of focus limits before cancellation of the focus limits, and subjected to distance estimation.

In a case wherein the determination result is NO in step S401, i.e., in the case of a state wherein the focus limits have been set, or in the case of tracking of a face being not performed, the control unit 120 proceeds to step S402, and in response to detection of a new face, regards the face thereof as a principal face serving as a focal object to execute the distance estimation based on the face size, and sets the focus limits, i.e., focus lens movement limits (near side limit FcNear, far side limit FcFar) in accordance with the distance estimated information.

On the other hand, in a case wherein the determination result is YES in step S401, the control unit 120 proceeds to step S403, and determines whether or not the focus conditions are satisfied regarding the face frame at the focal distance estimated position. This is processing for determining whether or not the detection value (AF evaluation value) obtained from the face frame set corresponding to a person's face serving as a target subject becomes the threshold (Ft) or more, and a focus state is confirmed.

In the case of a focus state being confirmed, the control unit 120 proceeds to step S405, executes the distance estimation based on the face size, and sets the focus limits, i.e., the focus lens movement limits (near side limit FcNear, Far side limit FcFar) in accordance with the distance estimated information.

On the other hand, in the case of no focus state being confirmed with the determination in step S403, the control unit 120 proceeds to step S404, and continues usual focus control wherein the focus limits in accordance with the distance estimated information based on a face size have not been set.

The series of processing described in the present Specification may be executed by hardware, or software, or a combination of both. In a case of executing the processing by software, a program in which the processing sequence is recorded may be installed for execution in memory within a computer embedded in dedicated hardware for execution, or the program may be installed for execution in a general-purpose computer which can execute various types of processing. For example, the program may be recorded in a recording medium beforehand. The program may be installed in a computer from the recording medium, and also may be received through a network such as a LAN (Local Area Network) or the Internet, and installed in a recording medium such as a built-in hard disk or the like.

Note that the various types of processing described in the present Specification may be executed not only in time-sequence following the order laid forth but also in parallel or individually according to the processing capabilities of the device for executing the processing, or as necessary. Also, with the present Specification, the term "system" represents a logical group arrangement of multiple devices, which is not restricted to an arrangement wherein the devices each having an individual configuration are housed in the same casing.

The present invention has been described in detail with reference to the specific embodiments. Note however, it is clearly evident that one skilled in the art can perform various modifications and alternations of the embodiments without departing from the essence of the present invention. That is to say, the present invention has been disclosed in an exemplary manner, and should not be interpreted restrictively. The claims should be referred to in order to determine the essence of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A data processing device, comprising:
   a face-detecting unit configured to detect a face region in a plurality of images nput from an imaging unit configured to image a subject including a face;
   a setting unit configured to
      calculate a distance to the subject based on a face size of the face detected by said face-detecting unit, and
      set limits serving as a focus lens operation range before and after a focus lens position with the calculated distance to the subject as a focal distance;
   a detecting unit configured to
      move a focus lens within the limits set by said setting unit, and
      detect a focal point where a detection value corresponding to a contrast intensity obtained from at least one face frame including the face detected by said face-detecting unit is equal to or greater than a predetermined threshold; and
   a control unit configured to
      determine, when a focal point has been detected within a predetermined set time, the focal point thereof as a focus position, wherein
   when executing focus control within the set limits, and based on the calculated distance to the subject including the face detected by said face-detecting unit, said control unit is configured to expand said limits, when detecting movement of a screen or face frame that is equal to or greater than a predetermined threshold, or when receiving input of operating information of any of zooming, panning, and tilting.

2. The data processing device according to claim 1, wherein said control unit is configured to cancel, when a focal point has not been detected within the predetermined set time, the limits set by said setting unit.

3. The data processing device according to claim 1, wherein said control unit is configured to set the following limits of
a near side limit, and
a far side operation limit,
as limits serving as said focus lens operation range, based on the upper limit and lower limit data of a predetermined stipulated face size.

4. The data processing device according to claim 1, wherein said control unit is configured to control execution timing for executing wobbling processing at the time of moving a focus lens within the limits set by said setting unit to determine a focus position in accordance with detection timing according to the face frame including the face detected by said face-detecting unit.

5. The data processing device according to claim 1, further comprising:
a calculation unit configured to calculate a score of the face detected by said face-detecting unit, the score including at least one of
the face size of a face,
a distance from the center of a face image, and
whether or not a face has been detected as a principal subject in a previous calculation;
wherein said control unit is configured to select a face having a high score calculated by said calculation unit as a principal face serving as a focal object.

6. The data processing device according to claim 5, wherein said control unit is configured to track the principal face which has been set by said control unit, and when tracking fails, to select a next principal face.

7. The data processing device according to claim 1, wherein said control unit is configured to
determine attributes of the subject based on features of the face detected by said face-detecting unit,
perform estimation of the face size based on the attributes, and
calculate the distance to the subject using the estimated face size.

8. A data processing method, comprising:
detecting a face region from a plurality of input images, the plurality of input images being input from a means for imaging a subject including a face;
calculating a distance to the subject based on a face size of the face detected in said detecting, and setting limits serving as a focus lens operation range before and after a focus lens position with the calculated distance to the subject as a focal distance;
moving a focus lens within the limits set in said setting, and detecting a focal point where a detection value corresponding to a contrast intensity obtained from a face frame including the face detected in said detecting is equal to or greater than a predetermined threshold;
determining, when a focal point has been detected within a predetermined set time, the focal point thereof as a focus position; and
expanding said limits, when detecting movement of a screen or face frame that is equal to or greater than a predetermined threshold, or when receiving input of operating information of any of zooming, panning, and tilting, when executing focus control within the set limits, and based on the calculated distance to the subject including the face detected in the detecting step.

9. A data processing device, comprising:
a face-detecting unit configured to detect a face region in a plurality of images input from a means for imaging a subject including a face;
a setting unit configured to
calculate a distance to the subject based on a face size of the face detected by said face-detecting unit, and
set limits serving as a focus lens operation range before and after a focus lens position with the calculated distance to the subject as a focal distance;
a detecting unit configured to
move a focus lens within the limits set by said setting unit, and
detect a focal point where a detection value corresponding to a contrast intensity obtained from at least one face frame including the face detected by said face-detecting unit is equal to or greater than a predetermined threshold; and
a control unit configured to
determine, when a focal point has been detected within a predetermined set time, the focal point thereof as a focus position, wherein
when executing focus control within the set limits, and based on the calculated distance to the subject including the face detected by said face-detecting unit, said control unit is configured to expand said limits, when detecting movement of a screen or face frame that is equal to or greater than a predetermined threshold, or when receiving input of operating information of any of zooming, panning, and tilting.

10. A data processing method comprising the steps of:
detecting a face region from a plurality of input images, the plurality of input images being input from an imaging unit configured to image a subject including a face;
calculating a distance to the subject based on a face size of the face detected in said detecting step, and setting limits serving as a focus lens operation range before and after a focus lens position with the calculated distance to the subject as a focal distance;
moving a focus lens within the limits set in said setting, and detecting a focal point where a detection value corresponding to a contrast intensity obtained from a face frame including the face detected in said detecting step is equal to or greater than a predetermined threshold;
determining, when a focal point has been detected within a predetermined set time, the focal point thereof as a focus position; and
expanding said limits, when detecting movement of a screen or face frame that is equal to or greater than a predetermined threshold, or when receiving input of operating information of any of zooming, panning, and tilting, when executing focus control within the set limits, and based on the calculated distance to the subject including the face detected in the step of detecting.

11. The data processing device according to claim 1, wherein when executing focus control within the set limits, and based on the calculated distance to the subject including the face detected by said face-detecting unit, said control unit is configured to expand said limits, when detecting movement of a screen or face frame which is equal to or greater than a predetermined threshold.

* * * * *